(12) United States Patent
Kusumi

(10) Patent No.: US 8,820,446 B2
(45) Date of Patent: Sep. 2, 2014

(54) VEHICLE AND METHOD FOR CONTROLLING VEHICLE

(75) Inventor: Hidetoshi Kusumi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 314 days.

(21) Appl. No.: 13/509,889

(22) PCT Filed: Nov. 17, 2009

(86) PCT No.: PCT/JP2009/069472
§ 371 (c)(1),
(2), (4) Date: Jul. 12, 2012

(87) PCT Pub. No.: WO2011/061811
PCT Pub. Date: May 26, 2011

(65) Prior Publication Data
US 2013/0035813 A1 Feb. 7, 2013

(51) Int. Cl.
| | | |
|---|---|---|
| *B60W 10/24* | (2006.01) | |
| *B60W 20/00* | (2006.01) | |
| *H01M 10/44* | (2006.01) | |
| *B60L 11/12* | (2006.01) | |
| *B60L 11/18* | (2006.01) | |
| *B60W 10/26* | (2006.01) | |
| *B60L 11/14* | (2006.01) | |
| *B60K 6/46* | (2007.10) | |
| *B60L 3/00* | (2006.01) | |
| *B60L 1/00* | (2006.01) | |

(52) U.S. Cl.
CPC ............. *B60W 10/26* (2013.01); *Y02T 10/6269* (2013.01); *H01M 10/44* (2013.01); *B60L 2240/12* (2013.01); *B60L 11/123* (2013.01); *B60L 2240/545* (2013.01); *Y02T 90/14* (2013.01); *Y02T 10/7241* (2013.01); *Y02T 10/7088* (2013.01); *B60L 11/1857* (2013.01); *Y02E 60/12* (2013.01); *B60L 2260/52* (2013.01); *B60W 20/00* (2013.01); *B60L 11/1816* (2013.01); *B60L 2210/30* (2013.01); *Y02T 90/121* (2013.01); *B60L 2220/14* (2013.01); *B60L 2240/525* (2013.01); *B60W 2510/244* (2013.01); *Y02T 10/7216* (2013.01); *B60L 11/14* (2013.01); *Y02T 10/6217* (2013.01); *B60L 2240/529* (2013.01); *B60L 2260/54* (2013.01); *B60L 2250/16* (2013.01); *B60W 2510/248* (2013.01); *B60L 2210/40* (2013.01); *B60L 11/1864* (2013.01); *Y02T 10/7077* (2013.01); *B60K 6/46* (2013.01); *Y02T 10/7061* (2013.01); *B60L 2210/10* (2013.01); *B60L 3/0046* (2013.01); *B60L 2240/547* (2013.01); *B60L 2240/527* (2013.01); *Y02T 90/127* (2013.01); *Y02T 10/7005* (2013.01); *B60L 11/1862* (2013.01); *Y02T 10/7044* (2013.01); *B60L 1/003* (2013.01)

USPC ............ 180/65.29; 180/65.27; 320/104; 320/134; 320/166; 701/22

(58) Field of Classification Search
CPC ..... B60W 10/06; B60W 10/08; B60W 20/00; B60W 2510/0638; B60W 2710/0644; Y02T 10/6286; Y02T 10/7022; Y02T 90/121; Y02T 10/84; Y02T 10/6239
See application file for complete search history.

(56) References Cited

U.S. PATENT DOCUMENTS

| | | | | |
|---|---|---|---|---|
| 6,534,954 | B1 * | 3/2003 | Plett | 320/132 |
| 7,880,597 | B2 * | 2/2011 | Uchida | 340/439 |
| 8,531,154 | B2 * | 9/2013 | Arai | 320/109 |
| 2003/0094321 | A1 | 5/2003 | Hirata et al. | |
| 2009/0227408 | A1 * | 9/2009 | Imamura et al. | 475/5 |
| 2010/0033132 | A1 * | 2/2010 | Nishi et al. | 320/136 |
| 2010/0292047 | A1 * | 11/2010 | Saito | 477/5 |
| 2013/0027048 | A1 * | 1/2013 | Schwarz et al. | 324/427 |

FOREIGN PATENT DOCUMENTS

| | | |
|---|---|---|
| JP | A-2001-157369 | 6/2001 |
| JP | A-2003-164006 | 6/2003 |
| JP | A-2003-199211 | 7/2003 |
| JP | A-2004-056867 | 2/2004 |
| JP | A-2005-065352 | 3/2005 |

| JP | A-2006-278132 | 10/2006 |
| JP | A-2008-024124 | 2/2008 |
| JP | A-2009-248822 | 10/2009 |

OTHER PUBLICATIONS

International Search Report issued in International Application No. PCT/JP2009/069472 dated Dec. 28, 2009 (with translation).

\* cited by examiner

*Primary Examiner* — Helal A Algahaim
*Assistant Examiner* — Paul Castro
(74) *Attorney, Agent, or Firm* — Oliff PLC

(57) ABSTRACT

A vehicle is equipped with a battery, an electric motor configured so as to generate the driving force of the vehicle by use of the electric power stored in the battery, a charger configured so as to supply the electric power outputted from the power supply outside of the vehicle to the battery, and an ECU configured so as to control the state of charge of the battery when the battery is charged. The ECU calculates an index value indicating the state of charge of the battery, and sets the control range thereof. The ECU raises the upper limit of the index value so that the possible travel distance of the vehicle becomes not less than the target distance when predetermined conditions on degradation of the battery are satisfied.

12 Claims, 22 Drawing Sheets

| AGE OF SERVICE | UPPER LIMIT VALUE(1) | UPPER LIMIT VALUE(2) |
|---|---|---|
| $y_0$ | ULa | ULb |
| $2y_0$ | ULb | ULc |
| $3y_0$ | ULc | ULd |
| ... | ... | ... |

| TRAVEL DISTANCE | UPPER LIMIT VALUE(1) | UPPER LIMIT VALUE(2) |
|---|---|---|
| $x_0$ | ULa | ULb |
| $2x_0$ | ULb | ULc |
| $3x_0$ | ULc | ULd |
| ... | ... | ... |

VEHICLE AND METHOD FOR CONTROLLING VEHICLE

TECHNICAL FIELD

The present invention relates to a vehicle and a method of controlling the vehicle and, more specifically, to charge-control of a power storage device mounted on a vehicle.

BACKGROUND ART

Vehicles including hybrid vehicles, electric vehicles and fuel-cell vehicles include a power storage device for storing electric power and an electric motor. As the electric power is supplied from the power storage device to the electric motor, the electric motor generates driving force for driving the vehicle. At the time of braking, the electric motor regenerates power. The regenerated electric power is supplied to the power storage device. Therefore, while the vehicle is running, charging and discharging of the power storage device are controlled such that an index value (SOC) indicating the state of charge of the power storage device is within an appropriate range. SOC is defined as a ratio of the current amount of charges with respect to the amount of charges in a fully charged state. SOC of the power storage device in the fully charged state is 100(%) and SOC of the power storage device not charged at all is 0(%).

By way of example, Japanese Patent Laying-Open No. 2004-56867 (PTL 1) discloses a hybrid vehicle control system in which control width of SOC of the power storage device is adjustable in accordance with traveling sections. The control system includes a road information acquiring unit acquiring road information of a scheduled travel route of the vehicle, a control width and traveling method determining unit for changing control width of SOC of power storage means and for determining the method of traveling of the vehicle, and a control processing unit for controlling traveling of the vehicle in accordance with the determined method of travel. The control width and traveling method determining unit calculates SOC of the power storage means (battery) in a prescribed section of the scheduled travel route of the vehicle, and based on the SOC, changes the control width of SOC. Further, the control width and traveling method determining unit determines the method of traveling of the hybrid vehicle such that SOC at the end of prescribed section is within the control width.

By way of example, Japanese Patent Laying-Open No. 2005-65352 (PTL 2) discloses a controller for controlling charging/discharging of a battery. The controller changes control width of battery SOC to prevent over-discharge of the battery, and avoids the influence of memory effect on charging/discharging of the battery. More specifically, the controller increases both the upper and lower limits of control width of the SOC, if memory effect occurs.

CITATION LIST

Patent Literature

PTL 1: Japanese Patent Laying-Open No. 2.004-56867
PTL 2: Japanese Patent Laying-Open No. 2005-65352

SUMMARY OF INVENTION

Technical Problem

The cruising distance of vehicles described above should preferably be as long as possible. In the present specification, the "cruising distance" refers to a distance a vehicle can travel by the electric power stored in the power storage device.

One solution to make longer the cruising distance is to increase the number of power storage devices or to increase the number of cells forming the power storage device. If the number of power storage devices or the number of cells increases, however, the volume and weight of the power storage device or devices naturally increase and, in addition, the cost for the power storage device or devices increases. As the weight of power storage device increases, the actual cruising distance could be shorter than the distance calculated based on the capacity of the power storage device.

The controller disclosed in PTL 1 changes the control width of SOC while the hybrid vehicle is traveling, in order to recover sufficient regenerative current to the battery. This can reduce fuel consumption of the hybrid vehicle. PTL 1 discloses, however, only the technique for reducing fuel consumption for a vehicle traveling in a given period of time.

While a hybrid vehicle travels repeatedly, the power storage device deteriorates gradually. When the power storage device deteriorates, capacity of the power storage device decreases. Therefore, as the hybrid vehicle is used for longer years, it possibly becomes more difficult to sufficiently attain the effect of reducing fuel consumption. PTL 1 does not describe any specific method of preventing decrease in capacity of the power storage device.

PTL 2 describes a method of preventing decrease in battery capacity caused by the memory effect. PTL 2, however, is silent about battery deterioration caused when the vehicle travels repeatedly. In other words, PTL 2 does not disclose battery control considering battery deterioration.

An object of the present invention is to provide a vehicle that can reduce deterioration of power storage device and ensure sufficient cruising distance.

Solution to Problem

According to an aspect, the present invention provides a vehicle, including: a power storage device configured to be rechargeable; an electric motor configured to generate driving force for driving the vehicle by using electric power stored in the storage device; a charging mechanism configured to supply electric power output from a power source outside the vehicle to the power storage device; a command generating unit configured to be switched between generation of a command to make longer a useable period of the power storage device and stopping of generation of the command, by a manual operation; and a controller configured to control state of charge of the power storage device when the power storage device is charged. The controller includes a state estimating unit configured to calculate an index value indicating the state of charge, and a setting unit configured to increase an upper limit value of the index value when prescribed condition related to deterioration of the power storage device is satisfied. The setting unit sets an amount of change of the upper limit value such that possible distance of travel of the vehicle attains to a target distance or longer.

Preferably, the setting unit is configured to make smaller the amount of change as the number of increase of the upper limit value increases.

Preferably, the setting unit is configured to increase the upper limit value repeatedly until the upper limit value reaches a standard value, and to maintain the upper limit value at the standard value once the upper limit value reached the standard value.

Preferably, the controller further includes a detecting unit configured to detect any abnormality occurred in the power storage device. The setting unit is configured to lower the upper limit value when the abnormality is detected by the detecting unit.

Preferably, the controller further includes a detecting unit configured to detect any abnormality occurred in the power storage device. The setting unit is configured to maintain the upper limit value at a present value when the abnormality is detected by the detecting unit.

Preferably, the prescribed condition is determined in advance based on period of use of the vehicle.

Preferably, the prescribed condition is determined in advance based on travel distance of the vehicle.

Preferably, the setting unit is capable of switching between a first mode having the upper limit value fixed and a second mode allowing adjustment of the upper limit value, and sets the amount of change in the second mode.

Preferably, the vehicle further includes a command generating unit configured to switch between generation of a command to extend a useable period of the power storage device and stopping of generation of the command, by a manual operation. The setting unit selects the second mode from the first and second modes when the command generating unit generates the command, and selects the first mode from the first and second modes when the command generating unit stops generation of the command.

According to another aspect, the present invention provides a method of controlling a vehicle. The vehicle includes a power storage device configured to be rechargeable, an electric motor configured to generate driving force for driving the vehicle by using electric power stored in the storage device, a charging mechanism configured to supply electric power output from a power source outside the vehicle to the power storage device, a command generating unit configured to switch between generation of a command to make longer a useable period of the power storage device and stopping of generation of the command, by a manual operation, and a controller configured to control state of charge of the power storage device when the power storage device is charged. The control method includes the steps of calculating an index value indicating the state of charge, and increasing an upper limit value of the index value when prescribed condition related to deterioration of the power storage device is satisfied. At the step of increasing the upper limit value, an amount of change of the upper limit value is set such that possible distance of travel of the vehicle attains to a target distance or longer.

Preferably, the control method further includes the step of making smaller the amount of change as the number of increase of the upper limit value increases.

Preferably, the control method further includes the step of limiting the upper limit value so that the upper limit value does not exceed a standard value when the upper limit value is increased repeatedly.

Preferably, the control method further includes the steps of detecting any abnormality occurred in the power storage device, and lowering the upper limit value when the abnormality is detected.

Preferably, the control method further includes the steps of detecting any abnormality occurred in the power storage device, and fixing the upper limit value at a present value when the abnormality is detected.

Preferably, the prescribed condition is determined in advance based on period of use of the vehicle.

Preferably, the prescribed condition is determined in advance based on travel distance of the vehicle.

Preferably, the vehicle control method further includes the step of selecting one of a first mode having the upper limit value fixed and a second mode allowing adjustment of the upper limit value. At the step of increasing the upper limit value, the amount of change is set when the second mode is selected.

Preferably, the vehicle further includes a command generating unit configured to be switched between generation of a command to extend a useable period of the power storage device and stopping of generation of the command, by a manual operation. At the step of selecting, the second mode is selected from the first and second modes when the command generating unit generates the command, and the first mode is selected from the first and second modes when the command generating unit stops generation of the command.

Advantageous Effects of Invention

By the present invention, deterioration of a power storage device mounted on the vehicle can be reduced, and sufficient cruising distance of the vehicle can be ensured.

DESCRIPTION OF EMBODIMENTS

Figure 1:
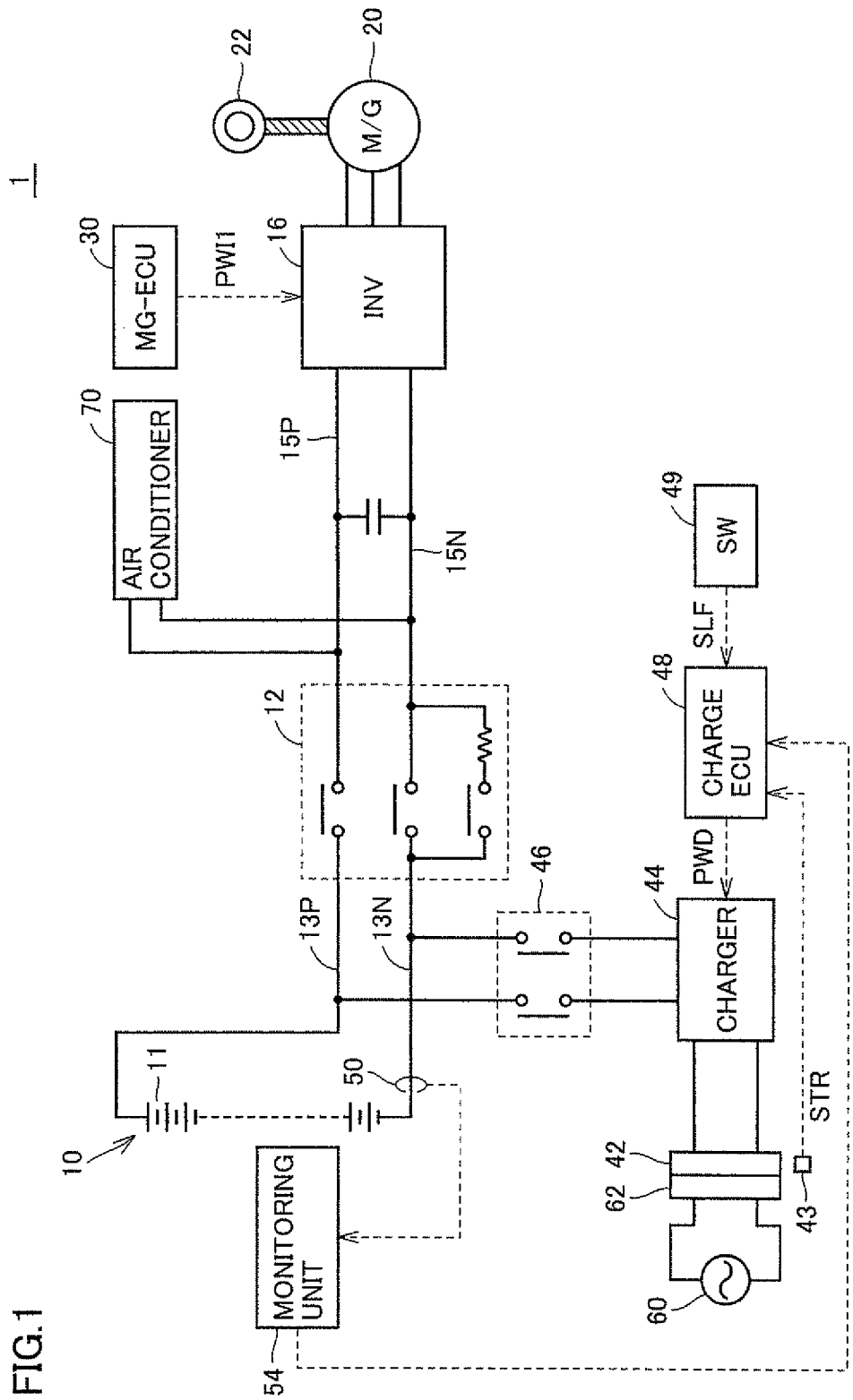
FIG. 1 is an overall block diagram of a vehicle in accordance with Embodiment 1 of the present invention.

In the following, embodiments of the present invention will be described in detail with reference to the figures. In the figures, the same or corresponding portions are denoted by the same reference characters, and description thereof will not be repeated.

Embodiment 1

FIG. 1 is an overall block diagram of the vehicle in accordance with Embodiment 1 of the present invention. Referring to FIG. 1, vehicle 1 in accordance with Embodiment 1 of the present invention includes a battery 10, a system main relay (hereinafter also referred to as "SMR") 12, an inverter 16, a motor generator (hereinafter also referred to as "MG") 20, driving wheels 22, and an MG-ECU (Electronic Control Unit) 30. Vehicle 1 further includes a charge inlet 42, a sensor 43, a charger 44, a relay 46, a charge ECU 48, a switch 49, a current sensor 50, a monitoring unit 54 and an air conditioner 70.

Battery 10 is a power storage device configured to be rechargeable. Battery 10 consists of a battery assembly including a plurality of cells 11 connected in series. In the present embodiment, battery 10 is a lithium ion battery.

When vehicle 1 travels, battery 10 supplies electric power for driving MG 20 to inverter 16. As the electric power stored in battery 10 is supplied to MG 20, MG 20 generates driving force for driving vehicle 1. At the time of braking of vehicle 1, electric power regenerated by MG 20 is supplied to battery 10. When electric power is supplied to vehicle 1 from a power source 60 provided outside of vehicle 1, charger 44 supplies the electric power to battery 10. With the supplied electric power, battery 10 is charged. Power source 60 is, for example, an AC power source.

SMR 12 is provided between battery 10 and inverter 16. SMR 12 is connected to battery 10 by a positive electrode line 13P and a negative electrode line 13N. SMR 12 is connected to inverter 16 by a positive electrode line 15P and a negative electrode line 15N. When vehicle 1 is running, SMR 12 is on. On the other hand, when battery 10 is charged by charger 44, SMR 12 is off. SMR 12 may be provided between battery 10 and relay 46.

Inverter 16 drives MG 20 based on a control signal PWI1 from MG-ECU 30.

Though not shown, inverter 16 is formed, for example, by a three-phase bridge circuit including U-phase, V-phase and W-phase arms. Inverter 16 converts DC power output from battery 10 to AC power, and supplies the AC power to MG 20. Inverter 16 coverts AC power generated by MG 20 to DC power and supplies the DC power to battery 10. For conversion between the DC power for the battery and the DC power for the inverter, a voltage converter (DC/DC converter) may be provided between battery 10 and inverter 16.

MG 20 is an AC rotating electrical machine, implemented, for example, by a three-phase AC synchronous electric motor having a rotor with a permanent magnet embedded. A rotation shaft of MG 20 is coupled to driving wheels 22. MG-ECU 30 generates control signal PWI1 for driving MG 20, and outputs the control signal PWI1 to inverter 16.

Connector 62 is provided outside of vehicle 1, and connected to power source 60. Charge inlet 42 is connected to the input side of charger 44 and is configured to be connectable to connector 62. When charge inlet 42 is connected to connector 62, the AC power from power source 60 is input to charge inlet 42. Sensor 43 detects connection between charge inlet 42 and connector 62, and outputs a signal STR indicating that charging of battery 10 can be started. When connector 62 is disconnected from charge inlet 42, sensor 43 stops output of the signal STR.

Charger 44 is connected by means of relay 46 to positive electrode line 13P and negative electrode line 13N, and supplies the electric power output from power source 60 to battery 10. Charger 44 is formed, for example, by an AC/DC converter converting AC power to DC power. Charger 44 converts AC power supplied from power source 60 to DC power based on a control signal PWD from charge ECU 48. The DC power output from charger 44 is supplied through relay 46, positive electrode line 13P and negative electrode line 13N to battery 10. While charger 44 is charging battery 10, relay 46 is kept on.

Charger 44 may be provided outside of vehicle 1. In that case, charge inlet 42 receives the DC power output from charger 44. The electric power input to charge inlet 42 is supplied through relay 46, positive electrode line 13P and negative electrode line 13N to battery 10. In short, charge inlet 42 and relay 46 supply electric power output from power source 60 to battery 10.

Charge ECU 48 starts control of charger 44 based on the signal STR from sensor 43. More specifically, charge ECU 48 generates a control signal PWD for driving charger 44 based on detected values of current, voltage and temperature transmitted from monitoring unit 54, and transmits the control signal PWD to charger 44. Based on the control signal PWD, charger 44 converts the AC power supplied from power source 60 to DC power.

Charge ECU 48 controls charger 44 based on an index value (SOC) indicating the state of charge of battery 10. When SOC of battery 10 reaches the upper limit value of a control range, charge ECU 48 stops output of control signal PWD. As the charge ECU 48 stops output of control signal PWD, charger 44 stops. As charger 44 stops, charging of battery 10 ends. SOC is defined as the ratio of the current amount of charges in battery 10 to the amount of charges in battery 10 in the fully charged state.

Switch 49 is mounted on vehicle 1 as a switch operated by a user. By manual operation, switch 49 can be switched to on-state and off-state. When switch 49 is on, switch 49 generates a command (signal SLF) for setting a charging mode of battery 10 to reduce deterioration of battery 10. As the deterioration of battery 10 is reduced, the period of use of battery 10 can be made longer. More specifically, the signal SLF is a command to make longer the period of use of battery 10. In the following, the charging mode for reducing deterioration of battery 10 will be referred to as "long life mode."

When the user turns off switch 49, switch 49 stops generation of signal SLF. Thus, setting of the long life mode is cancelled, and the charging mode of vehicle 1 is switched from the long life mode to a normal mode. Specifically, by operating switch 49, the user can select the charging mode of vehicle 1 from the long life mode and the normal mode.

Charge ECU 48 sets the control range of SOC for charging battery 10. The control range in the long life mode is narrower than the control range in the normal mode. Specifically, the upper limit value of control range in the long life mode is smaller than the upper limit value of control range in the normal mode. The lower limit value of control range in the long life mode is equal to or higher than the lower limit value of control range in the normal mode. Specifically, charge ECU 48 controls the state of charge of battery 10 at the time of charging battery 10.

In the following, the "upper limit of control range" is also referred to as "upper limit value of SOC" or simply "upper limit value."

Current sensor 50 detects a current input to battery 10 and a current output from battery 10, and outputs an analog signal that changes in accordance with the magnitude of current to monitoring unit 54.

Monitoring unit 54 converts the analog signal output from current sensor 50 to a digital signal indicating a current value. Monitoring unit 54 outputs the digital signal (current value) to charge ECU 48. Further, monitoring unit 54 detects temperature and voltage of each battery block consisting of a prescribed number of cells 11. Monitoring unit 54 outputs digital signals representing the temperature and voltage of each block to charge ECU 48.

Auxiliary machinery that operates with the electric power supplied from battery 10 is connected to positive electrode line 13P and negative electrode line 13N. FIG. 1 shows air conditioner 70 as a representative example of auxiliary machinery.

Figure 2:
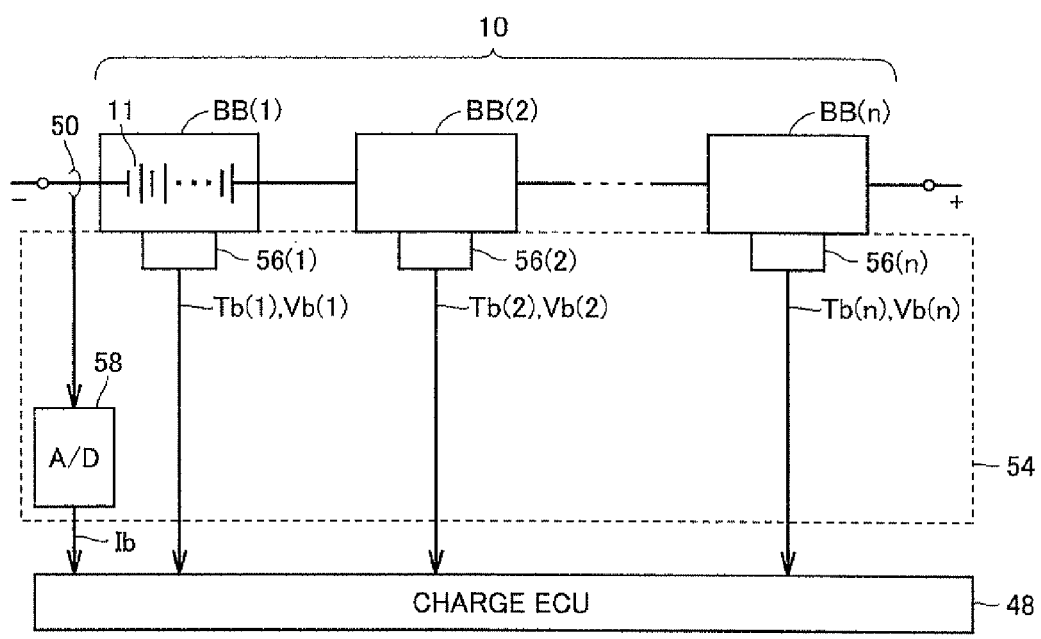
FIG. 2 shows an example of a configuration of a monitoring unit shown in FIG. 1.

FIG. 2 shows an example of a configuration of a monitoring unit shown in FIG. 1. Referring to FIG. 2, battery 10 includes a plurality of series-connected cells 11. The plurality of cells 11 is divided into a plurality of battery blocks BB(1) to BB(n) (n: natural number). Monitoring unit 54 includes a group of sensors 56(1) to 56(n) arranged corresponding to battery blocks BB(1) to BB(n), respectively, and an analog-digital converter (A/D) 58 arranged corresponding to current sensor 50.

Each of the sensors 56(1) to 56(n) detects the temperature and voltage of the corresponding block. Sensors 56(1) to 56(n) detect temperatures Tb(1) to Tb(n), respectively. Further, sensors 56(1) to 56(n) detect voltages Vb(1) to Vb(n), respectively. Detected values of sensors 56(1) to 56(n) are output to charge ECU 48.

Analog-digital converter 58 converts an analog signal from current sensor 50 to a digital signal. The digital signal indicates the value of current Ib. The current Ib represents the current input to battery 10 and the current output from battery 10.

In addition to the group of sensors 56(1) to 56(n) and analog-digital converter (A/D) 58 shown in FIG. 2, a monitor for monitoring voltage of cell 11 may be provided for each cell 11. Each monitor turns on a flag indicating abnormality of the cell, if the voltage of corresponding cell is out of a normal range. If any flag is turned on, charge ECU 48 can detect abnormality of battery 10.

Figure 3:
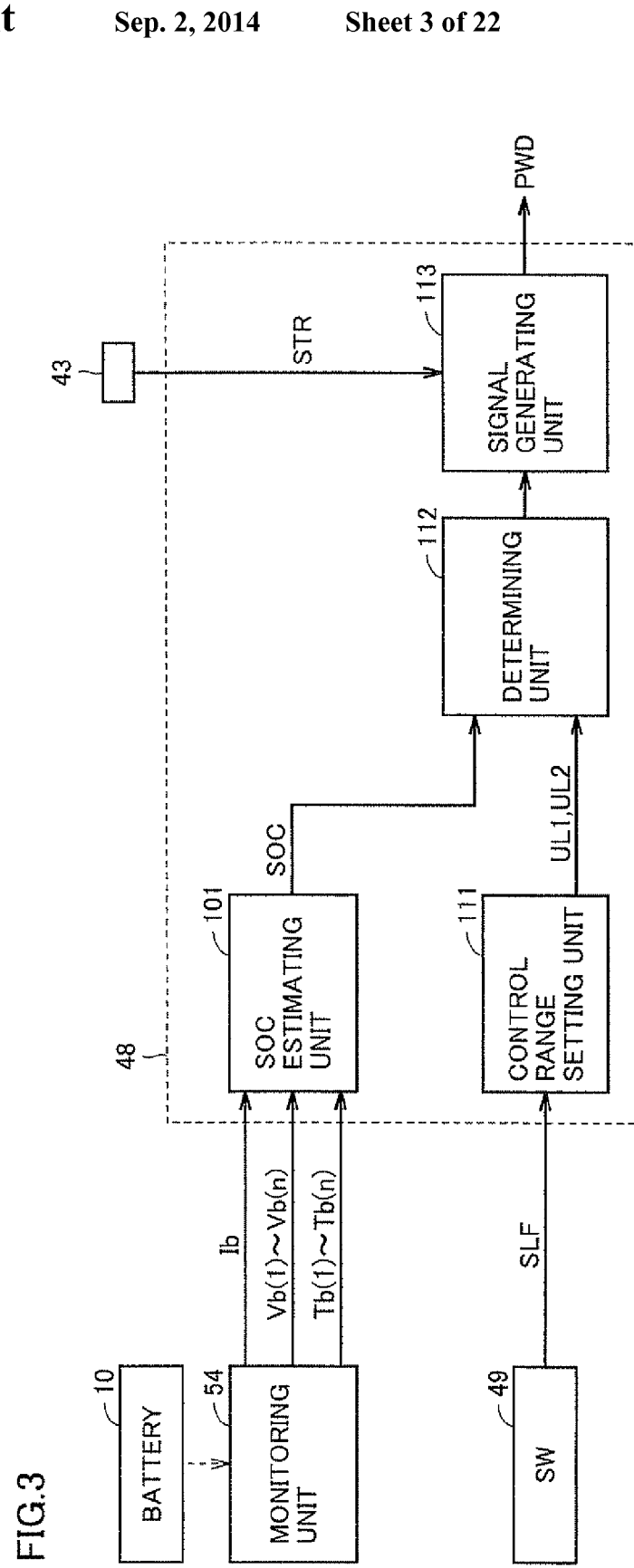
FIG. 3 is a functional block diagram of a charge ECU shown in FIG. 1.

FIG. 3 is a functional block diagram of a charge ECU shown in FIG. 1. Referring to FIG. 3, charge ECU 48 includes an SOC estimating unit 101, a control range setting unit 111, a determining unit 112 and a signal generating unit 113.

SOC estimating unit 101 receives detected values of current Ib, voltages Vb(1) to Vb(n) and temperatures Tb(1) to Tb(n), from monitoring unit 54. Based on each of the detected values, SOC estimating unit 101 calculates SOC of battery 10 as a whole. More specifically, SOC estimating unit 101 calculates, based on the detected values of each block, the SOC of the corresponding block, and based on the SOC of each block, calculates the overall SOC. In the present embodiment, a known method of calculating SOC of a lithium ion battery can be used for calculating SOC of each block. By way of example, SOC of each block may be calculated based on accumulated value of current Ib. Alternatively, SOC of each block may be calculated at a constant interval, based on correlation between open-circuit voltage (OCV) and SOC and on the voltage value detected by monitoring unit 54. The method of calculating the overall SOC from the SOC of each block is not specifically limited. For instance, the overall SOC may be an average value of SOC of the blocks.

Control range setting unit 111 sets the control range of SOC. If the switch 49 is off, switch 49 stops generation of signal SLF. Here, control range setting unit 111 sets the SOC control range to a first range, and outputs an upper limit value UL1 for the first range. On the other hand, if the user turns on switch 49, switch 49 generates signal SLF. Here, control range setting unit 111 sets the SOC control range to a second range and outputs an upper limit value UL2 for the second range. The first range represents the control range of SOC in the normal mode. The second range represents the control range of SOC in the long life mode.

Determining unit 112 receives SOC from SOC estimating unit 101, and receives either the upper limit value UL1 or UL2 from control range setting unit 111. Determining unit 112 determines whether or not SOC reached the upper limit value (UL1 or UL2). Determining unit 112 outputs the result of determination to signal generating unit 113.

Signal generating unit 113 generates control signal PWD based on the signal STR from sensor 43. Signal generating unit 113 outputs the control signal PWD to charger 44. If it is determined by determining unit 112 that SOC has reached the upper limit value, signal generating unit 113 stops generation of control signal PWD based on the result of determination by determining unit 112. As the generation of control signal PWD stops, charger 44 stops. As charger 44 stops, charging of battery 10 ends.

Figure 4:
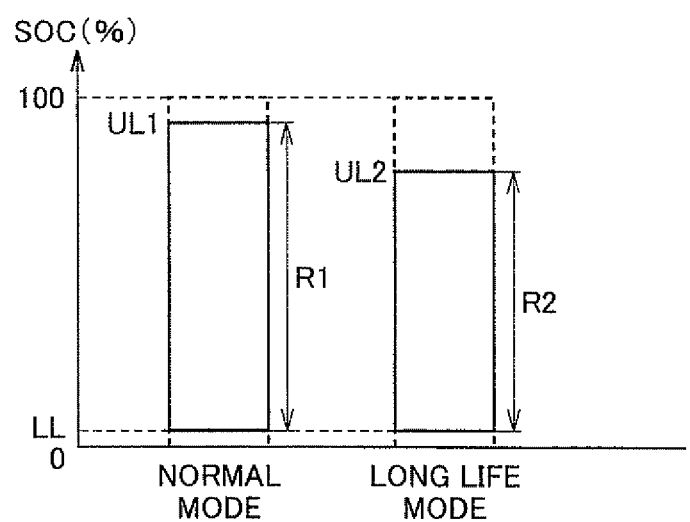
FIG. 4 is an illustration showing SOC control ranges in the normal mode and in the long life mode.

FIG. 4 is an illustration showing SOC control ranges in the normal mode and in the long life mode. Referring to FIG. 4, the first range R1 is the control range of SOC in the normal mode. The second range R2 is the control range of SOC in the long mode. UL1 represents the upper limit value of first range R1, and UL2 represents the upper limit value of second range R2.

The lower limit value of first range R1 and the lower limit value of second range R2 are both LL. It is noted, however, that the lower limit value of second range R2 may be higher than the lower limit value of first range R1. Upper limit value UL2 is smaller than upper limit value UL1. Therefore, the second range R2 is narrower than the first range R1. In order to prevent overcharge of battery 10, upper values UL1 and UL2 are both smaller than 100(%). In order to prevent overdischarge of battery 10, the lower limit value LL is larger than 0(%).

Figure 5:
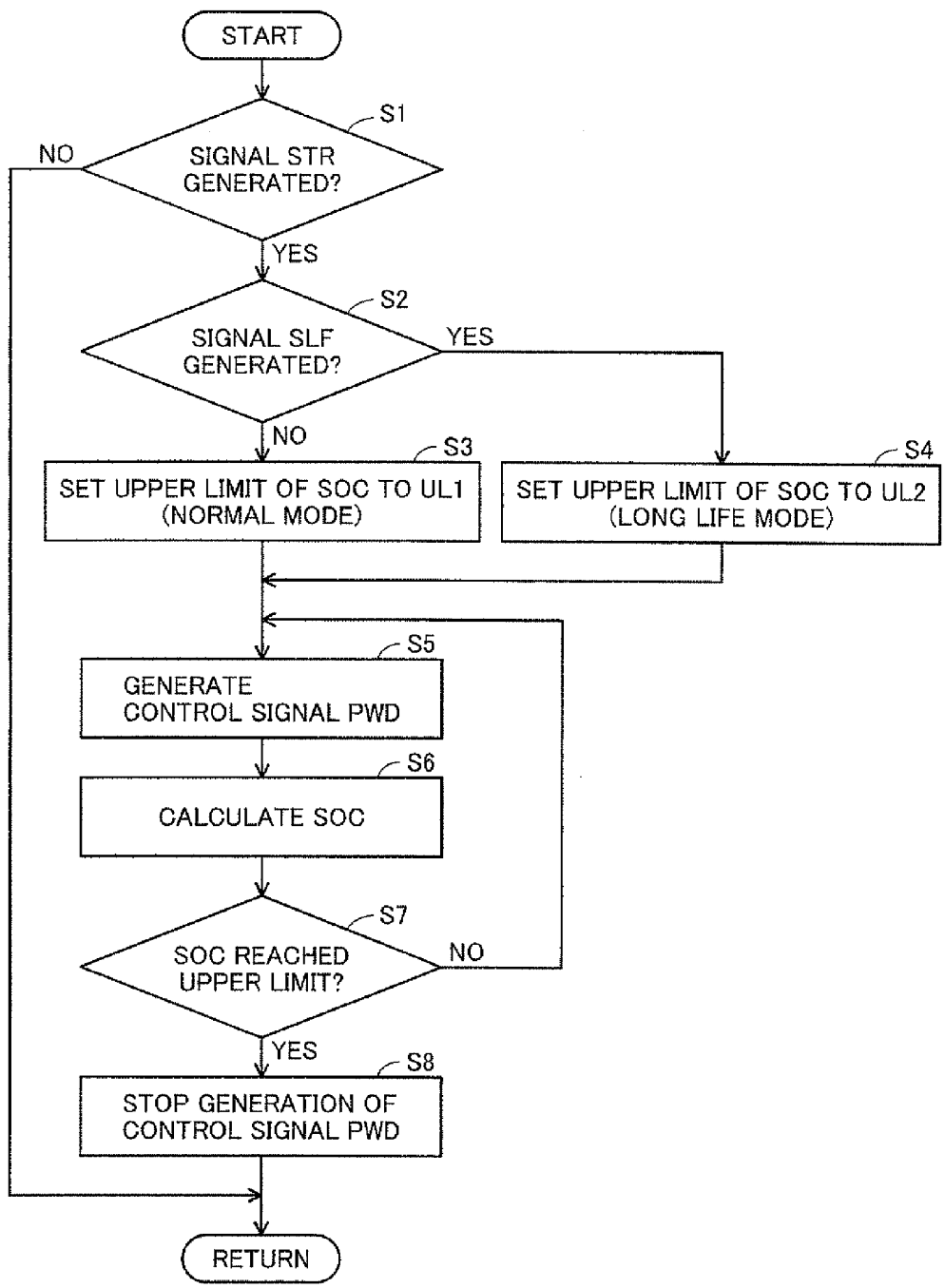
FIG. 5 is a flowchart representing control of battery charging executed by the charge ECU shown in FIG. 1.

FIG. 5 is a flowchart representing control of battery charging executed by the charge ECU shown in FIG. 1. The process of the flowchart is executed at every prescribed interval, or every time prescribed conditions are satisfied.

Referring to FIG. 5, at step S1, charge ECU 48 determines whether or not the signal STR is generated. If signal generating unit 113 receives the signal STR, signal generating unit 113 determines that the signal STR is generated. In this case (YES at step S1), the process proceeds to step S2. On the other hand, if signal generating unit 113 does not receive the signal STR, signal generating unit 113 determines that the signal STR is not generated. Then (NO at step S1), the process returns to the main routine.

At step S2, charge ECU 48 determines whether or not the signal SLF is generated. If control range setting unit 111 does not receive the signal SLF, control range setting unit 111 determines that the signal SLF is not generated. Then (NO at step S2), the process proceeds to step S3. On the other hand, if control range setting unit 111 receives the signal SLF, control range setting unit 111 determines that the signal SLF is generated. Then (YES at step S2), the process proceeds to step S4.

At step S3, charge ECU 48 (control range setting unit 111) sets the upper limit value of SOC control range to UL1. Thus, the charging mode is set to the normal mode. At step S4, charge ECU 48 (control range setting unit 111) sets the upper limit value of SOC control range to UL2. Thus, the charging mode is set to the long life mode. The upper limit value (UL1 or UL2) set by control range setting unit 111 is transmitted from control range setting unit 111 to determining unit 112.

After the process of step S3 or S4, the process of step S5 is executed. At step S5, charge ECU 48 (signal generating unit 113) generates the control signal PWD. Based on the control signal PWD, charger 44 converts the AC power supplied from power source 60 to DC power. As the DC power is supplied from charger 44 to battery 10, battery 10 is charged.

At step S6, charge ECU 48 calculates SOC of battery 10. More specifically, SOC estimating unit 101 calculates the overall SOC of battery 10 based on the current value Ib, voltage values Vb(1) to Vb(n) and temperatures Tb(1) to Tb(n) transmitted from monitoring unit 54.

At step S7, charge ECU 48 determines whether or not SOC has reached the upper limit value (UL1 or UL2). More specifically, at step S7, determining unit 112 compares the SOC calculated by SOC estimating unit 101 with the upper limit. Based on the result of comparison, determining unit 112 determines whether or not SOC has reached the upper limit value.

If it is determined that SOC has reached the upper limit value (YES at step S7), the process proceeds to step S8. On the other hand, if it is determined that SOC has not yet reached the upper limit value (NO at step S7), the process returns to step S5. Until SOC reaches the upper limit value, the process of steps S5 to S7 is executed repeatedly to charge battery 10.

At step S8, charge ECU 48 stops generation of the control signal PWD. More specifically, if it is determined by determining unit 112 that SOC has reached the upper limit value, signal generating unit 113 stops generation of control signal PWD based on the result of determination by determining unit 112. As a result, charging of battery 10 ends. If the process of step S8 ends, the overall process is returned to the main routine.

Vehicle 1 shown in FIG. 1 travels using the electric power stored in battery 10. In order to make longer the cruising distance of vehicle 1, it is necessary to take out as much power as possible from battery 10. If the capacity of battery 10 is increased, the amount of electric power taken out from battery 10 can be increased. Increase in battery capacity, however, possibly leads to increased weight and volume of battery 10.

In the present embodiment, the upper limit of SOC at the time of charging battery 10 is set as high as possible. More specifically, the upper limit value is determined in advance such that battery 10 is not overcharged when SOC reaches the upper limit value. On the other hand, the lower limit value (LL) of SOC is determined in advance as a value for preventing over-discharge of battery 10. Thus, it becomes possible to take out much electric power from battery 10. Thus, the cruising distance of vehicle 1 can be made longer.

Further, in the present embodiment, lithium ion battery is used as battery 10. Lithium ion battery is characterized by high energy density. As lithium ion battery is mounted on vehicle 1, it becomes possible to take out much electric power from battery 10, and the size and weight of battery 10 can be reduced.

If the lithium ion battery is kept at high SOC state (for example, fully charged state) for a long time, however, the characteristics of lithium ion battery deteriorate. For example, the capacity of lithium ion battery decreases. By keeping lithium ion battery in low SOC state, deterioration of characteristics of lithium ion battery can be reduced.

Figure 6:
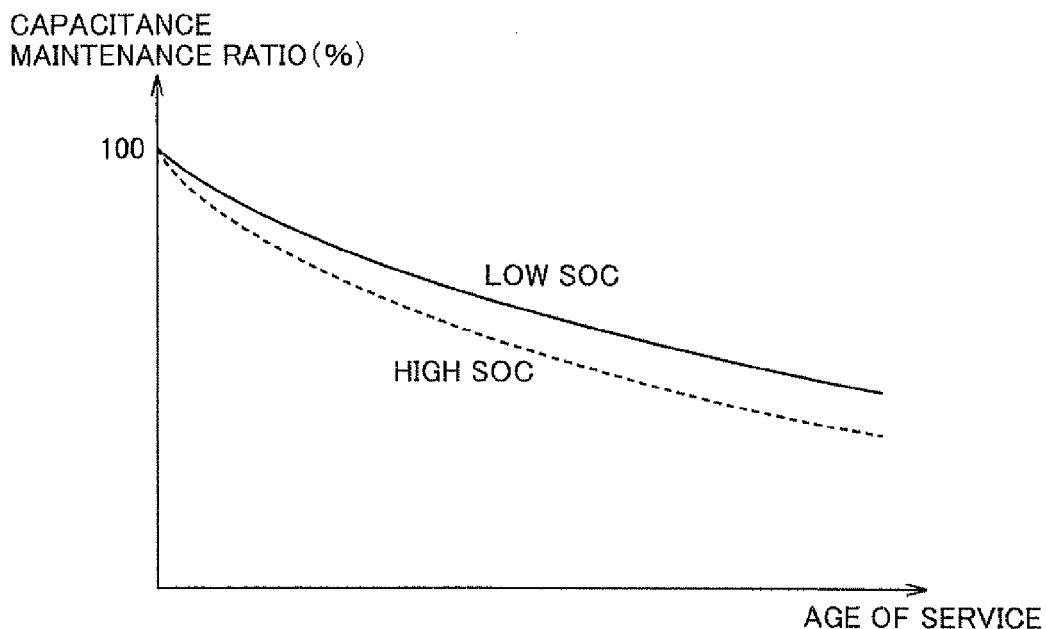
FIG. 6 is a graph showing correlation between age of service of a vehicle running with electric power stored in a lithium ion battery and capacity maintenance ratio of the lithium ion battery.

FIG. 6 is a graph showing correlation between age of service of a vehicle running with electric power stored in a lithium ion battery and capacity maintenance ratio of the lithium ion battery. Referring to FIG. 6, the capacity maintenance ratio when a lithium ion battery is brand-new is defined to be 100(%). As the vehicle travels repeatedly, the lithium ion battery deteriorates gradually. As the age of service of the vehicle becomes longer, the capacity maintenance ratio decreases. Namely, the capacity of lithium ion battery lowers. As the SOC at the end of charging of lithium ion battery is higher, the degree of decrease of capacity maintenance ratio to the age of service increases.

The period from the end of charging until start of traveling of vehicle 1 may differ user by user. Therefore, it is possible that battery 10 is kept at the high SOC state for a long time. If battery 10 is kept at high SOC state for a long time, the capacity of battery 10 may possibly decrease.

In the present embodiment, vehicle 1 has the long life mode for making longer the duration of battery 10. When the long life mode is set, SOC control range becomes narrower. More specifically, the upper limit value of control range is made lower. Since the control range of SOC becomes narrower, SOC at the completion of charging of battery 10 can be made lower. Thus, decrease in capacity of battery 10 can be reduced.

As the decrease in capacity of battery 10 is reduced, decrease in cruising distance of vehicle 1 can also be reduced. As a result, sufficient cruising distance of vehicle 1 can be ensured. By way of example, after a target age of service is reached, the vehicle can travel the target distance.

Figure 7:
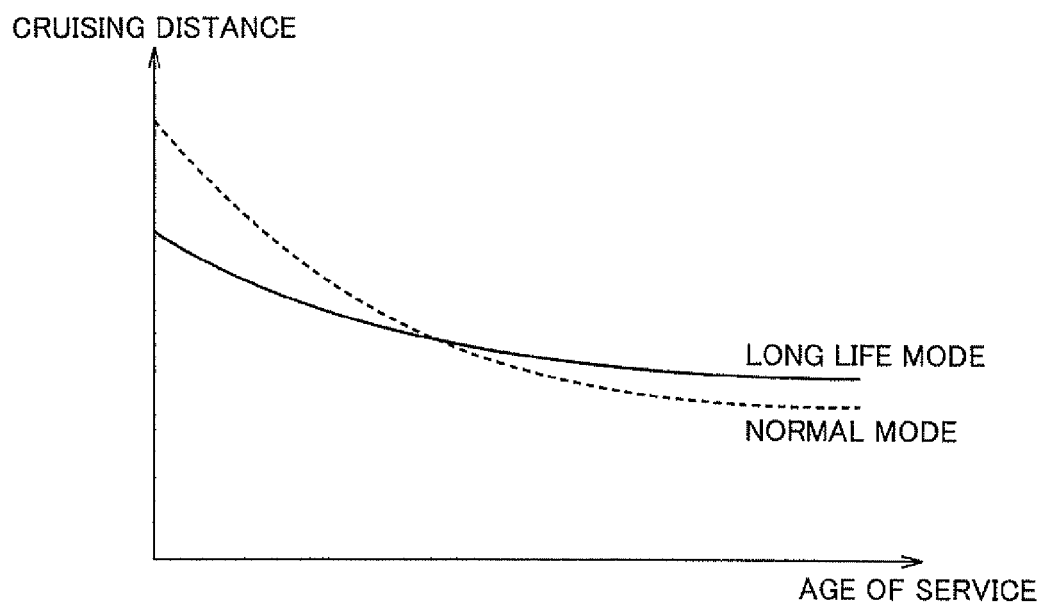
FIG. 7 is a graph showing cruising distances in the long life mode and the normal mode.

FIG. 7 is a graph showing cruising distances in the long life mode and the normal mode. Referring to FIG. 7, if the degree of deterioration of battery 10 is small, battery 10 can store much electric power. Therefore, while the age of service of vehicle 1 is short, the cruising distance in the normal mode is longer than that in the long life mode.

If battery 10 is charged to nearly full, however, deterioration of battery 10 intensifies. Particularly, if battery 10 is new and SOC of battery 10 is high, deterioration of battery 10 proceeds rapidly. If battery 10 is charged in the normal mode, the capacity of battery 10 decreases in a large degree.

On the other hand, if battery 10 is charged in the long life mode, it can slow down deterioration of battery 10. Thus, by charging battery 10 in the long life mode, decrease in capacity of battery 10 can be reduced. As shown in FIG. 7, if the age of service of vehicle 1 becomes longer, the cruising distance in the long life mode can be made longer than that in the normal mode. Specifically, by charging battery 10 in the long life mode, deterioration of battery 10 can be reduced and longer cruising distance of vehicle 1 can be ensured.

Further, according to the present embodiment, vehicle 1 has switch 49 that is operated by the user. By operating switch 49, the user can select the charging mode of battery 10 from the normal mode and the long life mode. If the long life mode is selected, deterioration of battery 10 can be reduced and, hence, even after the age of service becomes longer, sufficient cruising distance can be ensured. On the other hand, if battery 10 has sufficient margin in its performance (when the age of service is short) and the normal mode is selected, the amount of charges of battery 10 can be increased and, therefore, higher traveling performance of vehicle 1 can be attained. For example, vehicle can travel longer distance than normal cruising distance.

According to the present embodiment, since the user can select the charging mode from the normal mode and the long life mode, convenience for the user can be improved.

The control range of SOC during traveling is set independently from the control range at the time of charging battery 10. By way of example, at the time of braking of vehicle 1, SOC increases as battery 10 is charged by regenerative power from MG 20. As a result, SOC possibly becomes higher than the upper limit value at the time of charging of battery 10. SOC, however, lowers again as vehicle 1 continuously travels. Specifically, while vehicle 1 is traveling, it is not likely that battery 10 is kept at the high SOC state for a long time. Therefore, the control range of SOC during traveling can be set independent from the control ranges in the long life mode and in the normal mode.

It is noted, however, that even if the long life mode is selected as the charging mode, battery 10 deteriorates as the age of service of battery 10 becomes longer. Therefore, as the age of service of vehicle 1 becomes longer, the cruising distance becomes shorter. Therefore, in the present embodiment, the upper limit value (UL2) of the SOC control range is increased if the long life mode is selected as the charging mode and prescribed conditions related to deterioration of battery 10 are satisfied.

Figure 8:
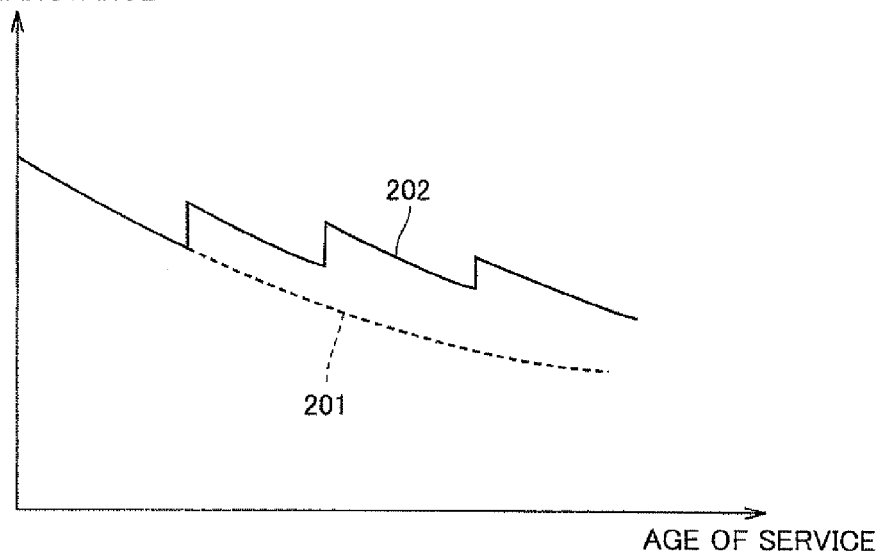
FIG. 8 shows a cruising distance that can be attained by the control in accordance with an embodiment.

FIG. 8 shows a cruising distance that can be attained by the control in accordance with the present embodiment. Referring to FIG. 8, the upper limit value of the SOC control range increases at a prescribed timing based on the state of deterioration of battery 10. If the upper limit value is fixed, the cruising distance only decreases (see dotted line 201). On the other hand, by increasing the upper limit value, the amount of charges in battery 10 can be increased (see solid line 202). Thus, the cruising distance can be increased.

Because of deterioration of battery 10, capacity of battery 10 decreases. If the upper limit value of the control range of SOC is fixed, the amount of electric power that can be taken out from battery 10 decreases as the age of service becomes longer. Therefore, as indicated by the dotted line, as the age of service becomes longer, the cruising distance becomes shorter. In accordance with the present embodiment, as the upper limit value of the control range is increased at an appropriate timing, the cruising distance can be made longer. Thus, the target cruising distance can be ensured when, for example, the target age of service is reached.

Causes of deterioration of battery 10 are the age of service of battery 10 and travel distance of vehicle 1. Therefore, in the present embodiment, the upper limit of the control range is changed based on at least one of the age of service of battery 10 and the travel distance of vehicle 1. In the following, the control of upper limit value based on the age of service of battery 10 and the control of upper limit value based on the travel distance will be described.

Figure 9:
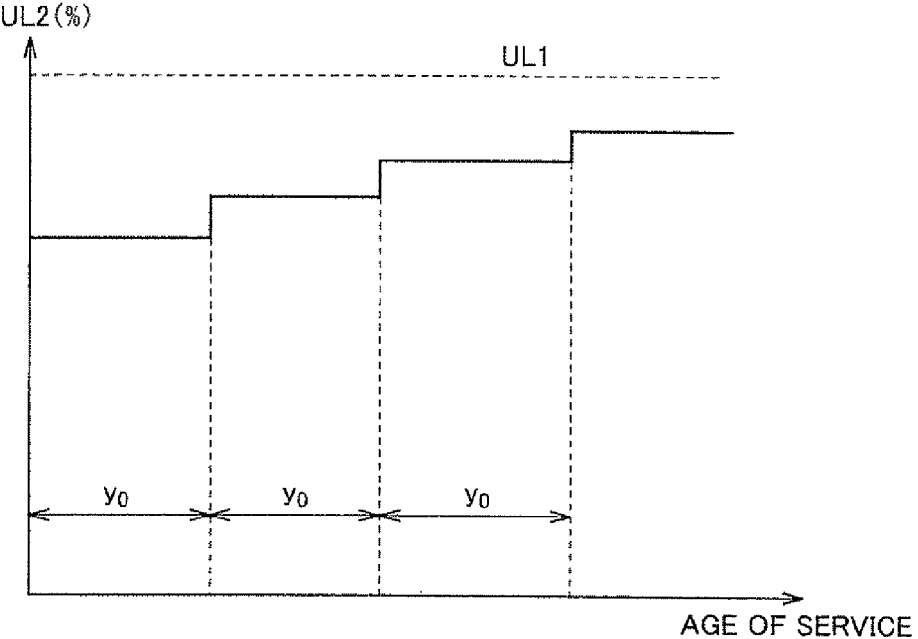
FIG. 9 is a graph representing control of an upper limit value of control range based on age of service of a battery 10.

FIG. 9 is a graph representing control of an upper limit value of control range based on age of service of battery 10. Referring to FIG. 9, every time the age of service of battery 10 attains prescribed years ($y_0$), the upper limit value UL2 increases.

Figures 10, 11:
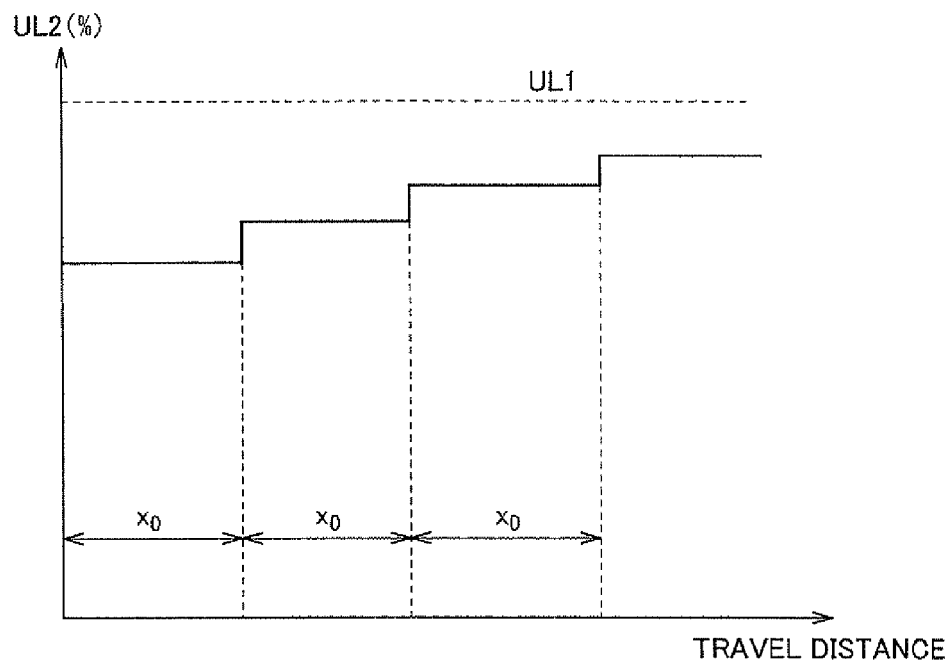
FIG. 10 is a graph representing control of an upper limit value of control range based on travel distance of a vehicle 1.
FIG. 11 shows a first example of a table stored in a control range setting unit 111 shown in FIG. 3.

FIG. 10 is a graph representing control of an upper limit value of control range based on travel distance of vehicle 1. Referring to FIG. 10, every time the travel distance of the vehicle reaches a prescribed distance (x0), the upper limit value UL2 increases.

The control pattern of upper limit value UL2 shown in FIG. 9 or FIG. 10 is stored as a map or a table in control range setting unit 111. Control range setting unit 111 changes the upper limit value UL2 of the control range in accordance with the map or the table. Each of FIGS. 9 and 10 shows a control pattern of increasing upper limit value UL2 based on either one of the travel distance and the age of service. In the present embodiment, the upper limit value UL2 may be increased based both on the travel distance and the age of service. Specifically, when the age of service of the battery reached a prescribed value, or when the travel distance reached a prescribed distance, the upper limit value UL2 of SOC control range may be increased. It is noted, however, that the upper limit value UL2 is smaller than upper limit value UL1.

Control range setting unit 111 calculates the travel distance of the vehicle based on the velocity of the vehicle detected, for example, by a vehicle speed sensor, not shown. Further, control range setting unit 111 measures the period in which the vehicle speed is not 0, as the age of service of the vehicle. The methods mentioned above are examples of measuring the travel distance and the age of service of the vehicle. The travel distance and the age of service of the vehicle may be measured by various known methods.

If battery 10 is much deteriorated, however, the capacity of battery 10 decreases to a large degree. As described above, SOC represents the ratio of current amount of charges to the amount of charges in the fully charged state. Therefore, when battery 10 is much deteriorated, the cruising distance may not reach the target value if battery 10 is charged to the upper limit value of SOC.

Therefore, charge ECU 48 (control range setting unit 111) increases the upper limit value UL2 to a value that can ensure the target cruising distance. The amount of change of upper limit value UL2 is determined by an experiment of repeating charging and discharging of the battery in accordance with standard travel pattern of vehicle 1. The map or table stored in control range setting unit 111 is determined based on the amount of change in the upper limit value obtained through the experiment. In the following descriptions, control range setting unit 111 stores the table for defining the upper limit value.

FIG. 11 shows a first example of a table stored in a control range setting unit 111 shown in FIG. 3. Referring to FIG. 11, the upper limit value (1) represents the original upper limit value, and the upper limit value (2) is a value after the upper limit value (1) is increased. The combination of upper limit values (1) and (2) is determined in advance for every prescribed number of years $y_0$.

By way of example, if the age of service reaches the year $y_0$, the upper limit value of SOC increases from ULa to ULb. The amount of change of the upper limit value is (ULb−ULa). As battery 10 deteriorates, the cruising distance of vehicle 1 gradually decreases. The amount of change (ULb−ULa) is set such that the cruising distance after the age of service reached the year $y_0$ is equal to or longer than the target value.

While the age of service is from the year $y_0$ to $2y_0$, the upper limit value of SOC is kept at ULb. In this period, the cruising distance decreases gradually. When the age of service reaches the year $2y_0$, the upper limit value of SOC increases from ULb to ULc. The amount of change of upper limit value is (ULc−ULb). As the upper limit value increases, the cruising distance again increases. Though (ULc−ULb) is equal to (ULb−ULa), it may be different from (ULb−ULa).

While the age of service is from the year $2y_0$ to $3y_0$, the upper limit value of SOC is kept at ULc. When the age of service reaches the year $3y_0$, the upper limit value of SOC increases from ULc to ULd.

Figures 12, 13:
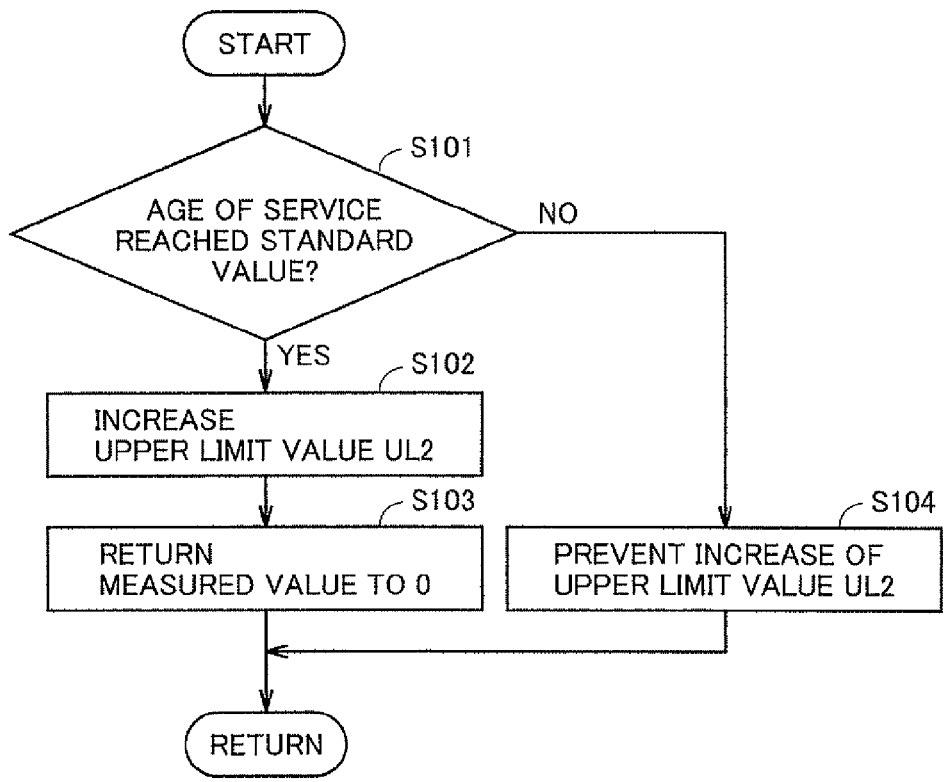
FIG. 12 shows a second example of a table stored in control range setting unit 111 shown in FIG. 3.
FIG. 13 is a flowchart representing a control executed in accordance with the table shown in FIG. 11.

FIG. 12 shows a second example of a table stored in control range setting unit 111 shown in FIG. 3. Referring to FIG. 12, every time the travel distance reaches a prescribed distance $x_0$, the upper limit value of SOC increases. Thus, as when the table shown in FIG. 11 is used, the target cruising distance can be ensured.

FIGS. 8 to 12 show control patterns in which the upper limit value is increased a number of times. The number of increasing the upper limit value may be once. The number of increasing the upper limit value may be determined, for example, based on a standard age of service of vehicle 1, capacity of battery 10 or the target cruising distance.

FIG. 13 is a flowchart representing a control executed in accordance with the table shown in FIG. 11. The process of the flowchart is executed if the long life mode is set (step S4 of FIG. 5), at every prescribed time interval, or when prescribed conditions are satisfied.

Referring to FIG. 13, at step S101, charge ECU 48 determines whether or not the age of service of battery 10 has reached a standard value ($y_0$). Charge ECU 48 (control range setting unit 111) measures, for example, the years of travel of vehicle 1. The measured value is used as the age of service of battery 10. If the measured value reaches the standard value ($y_0$), charge ECU 48 (control range setting unit 111) determines that the age of service of battery 10 has reached the standard value.

If it is determined that the age of service of battery 10 has reached the standard value (YES at step S101), the process proceeds to step S102. On the other hand, if it is determined that the age of service of battery 1 has not yet reached the standard value (NO at step S101), the process proceeds to step S104.

At step S102, charge ECU 48 (control range setting unit 111) increases the upper limit value UL2. Here, control range setting unit 111 sets the upper limit value UL2 in accordance with the table shown in FIG. 11. Thus, upper limit value UL2 increases. Following the process of step S102, the process of step S103 is executed.

At step S103, charge ECU 48 (control range setting unit 111) returns the measured value of years of travel of vehicle 1 to 0. If the process at step S103 ends, the overall process returns to the main routine.

At step S104, charge ECU 48 (control range setting unit 111) prevents increase of upper limit value UL2. Namely, the upper limit value UL2 is not changed. If the process at step S104 ends, the overall process returns to the main routine.

Figure 14:
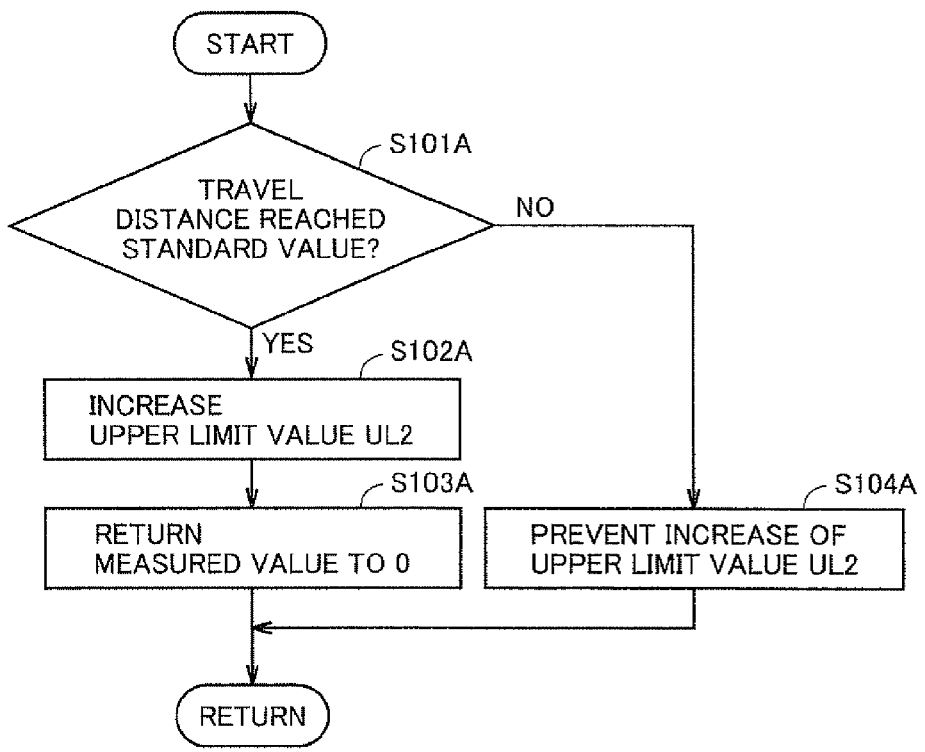
FIG. 14 is a flowchart representing a control executed in accordance with the table shown in FIG. 12.

FIG. 14 is a flowchart representing a control executed in accordance with the table shown in FIG. 12. The process of the flowchart is executed if the long life mode is set (step S4 of FIG. 5), at every prescribed time interval, or when prescribed conditions are satisfied.

Referring to FIG. 14, at step S101A, charge ECU 48 (control range setting unit 111) determines whether or not the travel distance of vehicle 1 has reached the standard value ($x_0$). If it is determined that the travel distance of vehicle 1 has reached the standard value (YES at step S101A), the process proceeds to step S102A. On the other hand, if it is determined that the travel distance of vehicle 1 has not yet reached the standard value (NO at step S101A), the process proceeds to step S104A.

At step S102A, charge ECU 48 (control range setting unit 111) increases the upper limit value UL2. Here, control range setting unit 111 sets the upper limit value UL2 in accordance with the table shown in FIG. 12. Thus, upper limit value UL2 increases. Following the process at step S102A, the process of step S103A is executed.

At step S103A, charge ECU 48 (control range setting unit 111) returns the measured value of travel distance of vehicle 1 to 0. If the process at step S103A ends, the overall process returns to the main routine.

At step S104A, charge ECU 48 (control range setting unit 111) prevents increase of upper limit value UL2. Namely, the upper limit value UL2 does not change. If the process at step S104A ends, the overall process returns to the main routine.

As described above, according to Embodiment 1, if prescribed conditions related to deterioration of the battery are satisfied, the charge ECU increases the upper limit value (UL2) of the SOC control range in the long life mode. The amount of change in the upper limit value is determined in advance such that the cruising distance of vehicle 1 attains to the target value or longer. Therefore, decrease in cruising distance can be prevented at least when the travel distance becomes longer or when the age of service becomes longer. The upper limit value (UL2) is smaller than the upper limit value (UL1) when battery 10 is charged in the normal mode. Therefore, the effect of reducing deterioration of battery 10 can be attained.

Embodiment 2

Figure 15:
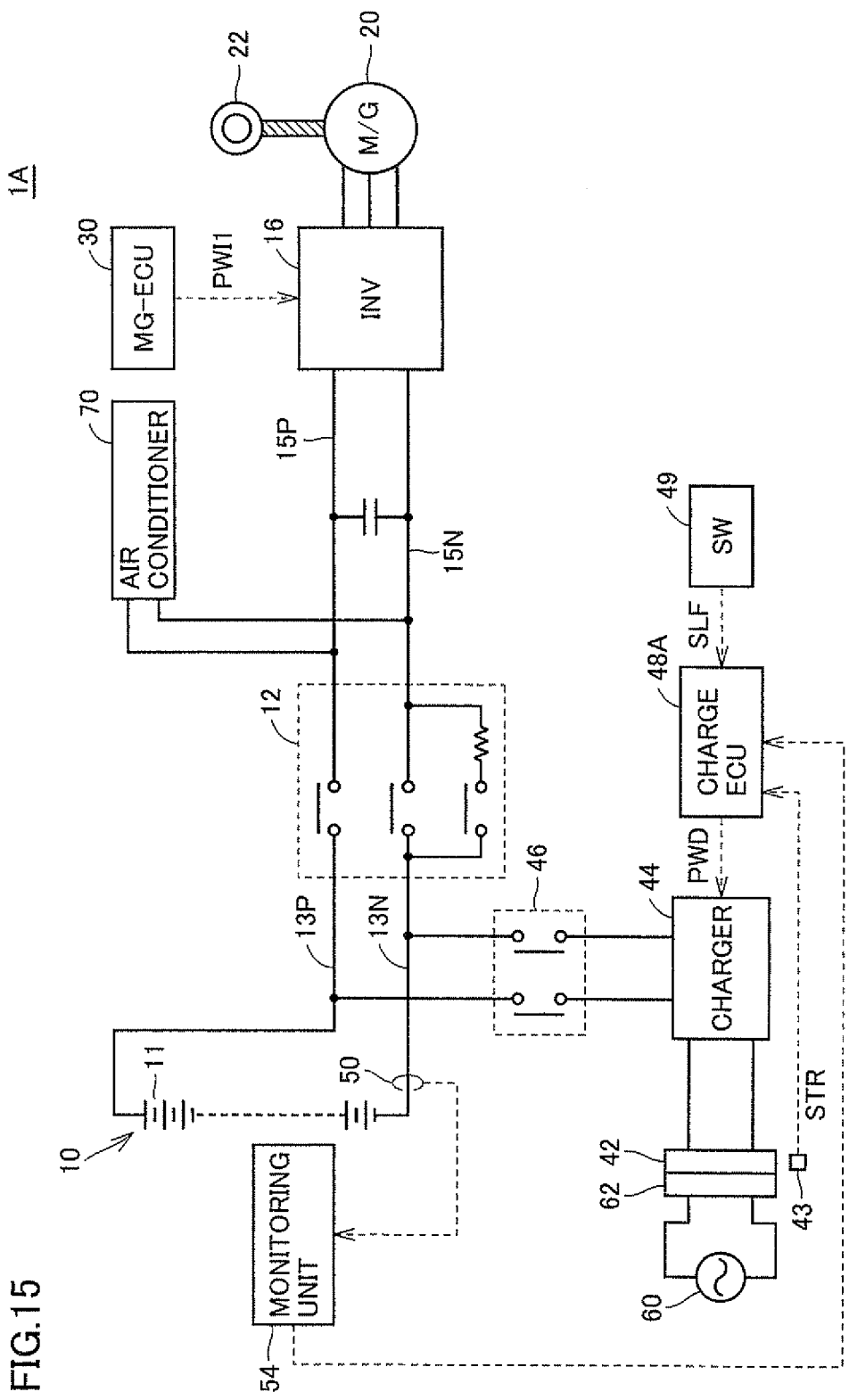
FIG. 15 is an overall block diagram of a vehicle in accordance with Embodiment 2 of the present invention.

FIG. 15 is an overall block diagram of a vehicle in accordance with Embodiment 2 of the present invention. Referring to FIGS. 15 and 1, a vehicle 1A is different from vehicle 1 in that it includes a charge ECU 48A in place of charge ECU 48.

When the long life mode SOC is set as the charging mode and prescribed condition related to deterioration of battery 10 is satisfied, charge ECU 48A increases the upper limit value of SOC control range. Further, charge ECU 48A stores the number of increase of upper limit value UL2. If the number is one or more, charge ECU makes smaller the mount of change of upper limit value UL2 this time than the amount of change last time. For example, when the upper limit value UL2 is increased the second time, the amount of change of upper limit value UL2 is smaller than the amount of change when the upper limit value UL2 was increased for the first time.

Figure 16:
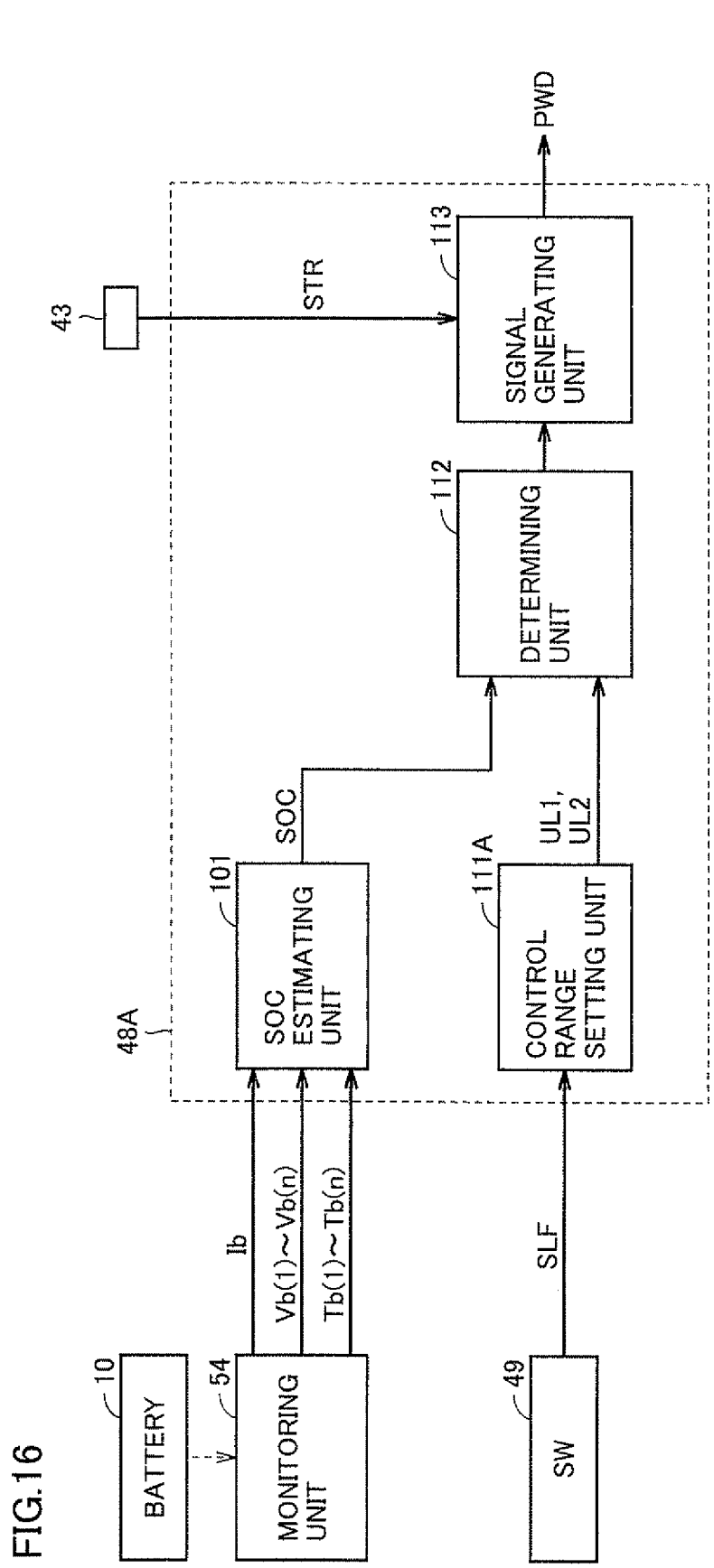
FIG. 16 is a functional block diagram of a charge ECU shown in FIG. 15.

FIG. 16 is a functional block diagram of a charge ECU shown in FIG. 15. Referring to FIGS. 16 and 3, charge ECU 48A is different from charge ECU 48 in that it includes a control range setting unit 111A in place of control range setting unit 111.

Control range setting unit 111A stores the number the upper limit value UL2 was increased in the past. If the number is one or more, it means that control for increasing the upper limit value UL2 has been executed. If the number of increase of upper limit value UL2 is one or more and the prescribed condition related to deterioration of battery 10 is satisfied, control range setting unit 111A increases the upper limit value UL2 with the amount of change of upper limit value UL2 made smaller than the amount of change last time.

As in Embodiment 1 above, control range setting unit 111A increases the upper limit value UL2 at least when the age of service of the vehicle reaches the standard value ($y_0$) or when the travel distance of the vehicle reaches the standard value ($x_0$). In the following, control of charge ECU 48A when the age of service of the vehicle has reached the standard value ($y_0$) will be described as a representative.

Figure 17:
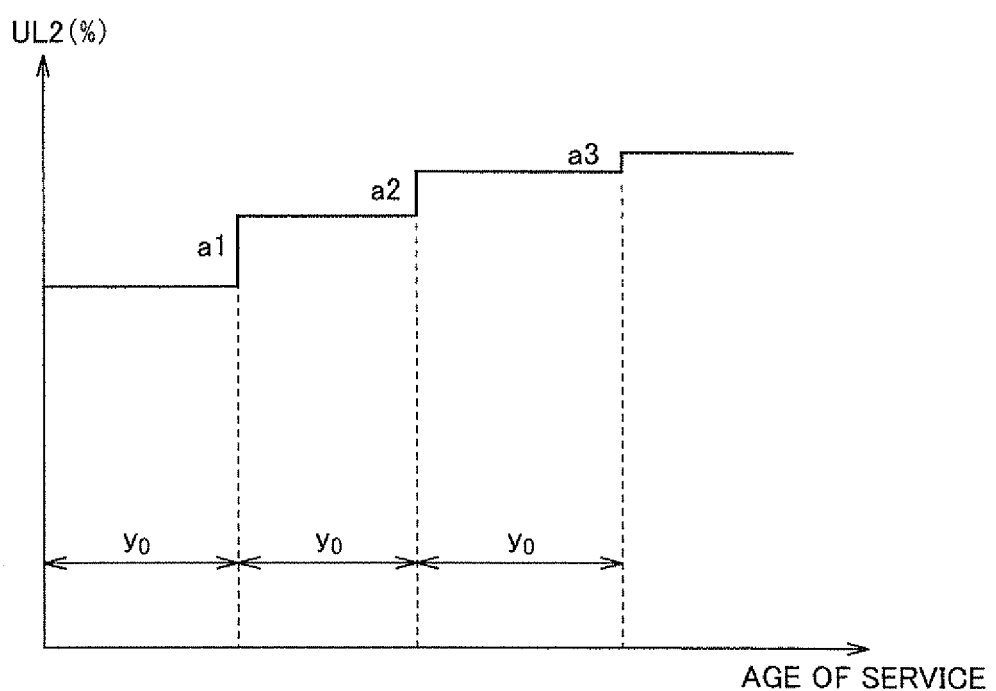
FIG. 17 is a graph representing control of an upper limit value of control range in accordance with Embodiment 2.

FIG. 17 is a graph representing control of an upper limit value of control range in accordance with Embodiment 2. Referring to FIG. 17, when the age of service reaches the year $y_0$, the upper limit value UL2 of SOC increases. The amount of change of upper limit value UL2 here is a1. When the age of service reaches the year $2y_0$, the upper limit value UL2 of SOC increases. The amount of change of upper limit value UL2 here is a2 (<a1). When the age of service reaches the year $3y_0$, the upper limit value UL2 of SOC increases. The amount of change of upper limit value UL2 here is a3 (<a2).

By way of example, charge ECU 48A stores the relation between the age of service and the upper limit value shown in FIG. 17 as a map (or a table).

Figure 18:
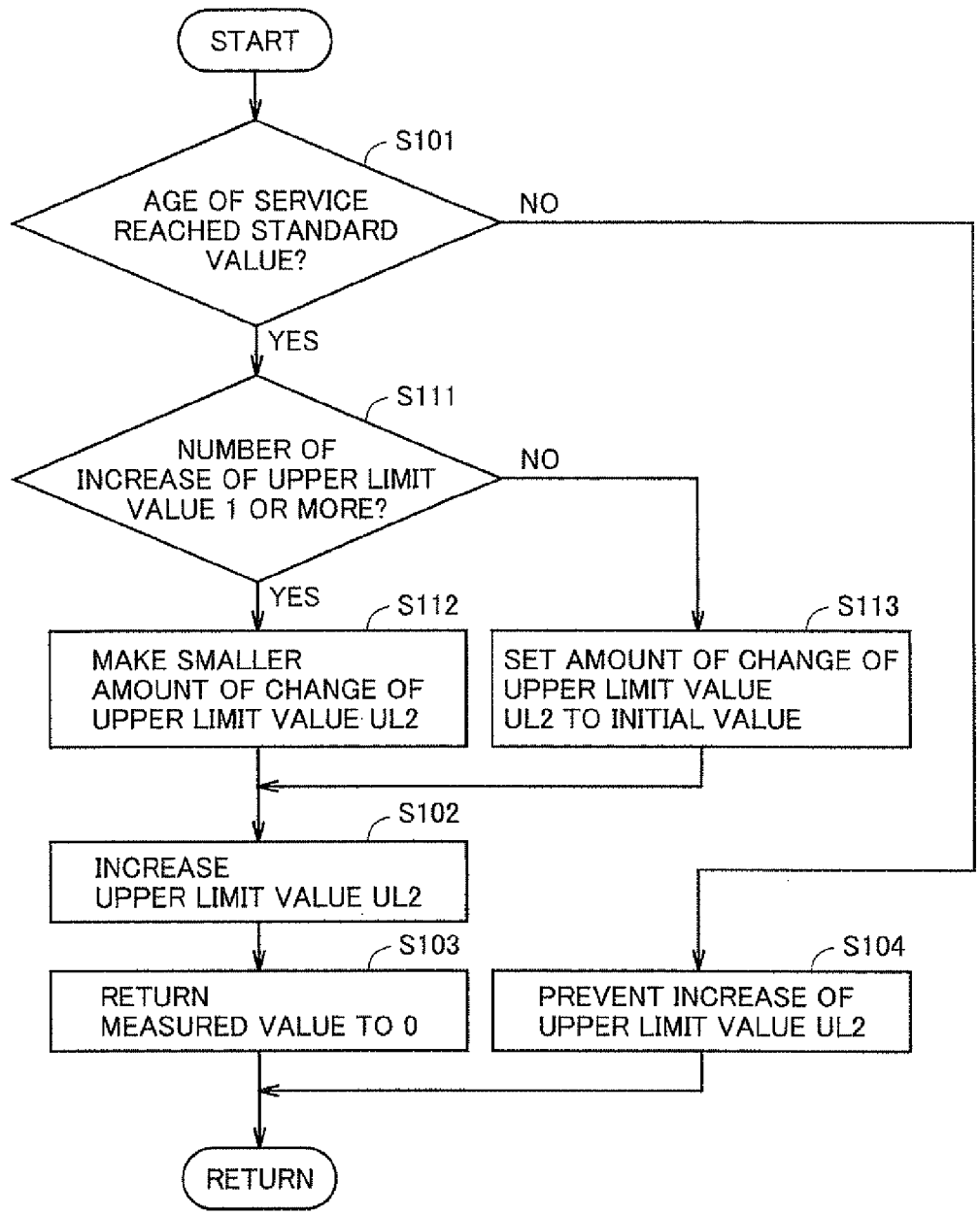
FIG. 18 is a flowchart representing a control executed by the charge ECU shown in FIG. 15.

FIG. 18 is a flowchart representing a control executed by the charge ECU shown in FIG. 15. The process shown in the flowchart is executed at every prescribed interval or every time prescribed conditions are satisfied.

Referring to FIGS. 18 and 13, the flowchart shown in FIG. 18 is different from the flowchart of FIG. 13 in that the process of steps S111 to S113 is added.

If it is deter mined that the age of service of battery 10 has reached the standard value (YES at step S101), the process proceeds to step S111. At step S111, charge ECU 48A (control range setting unit 111) determines whether or not the number of increase of upper limit value UL2 is one or more. The number of times represents the number up to the present time.

If the number of increase of upper limit value UL2 is one or more (YES at step S111), the process proceeds to step S112.

At step S112, control range setting unit 111A makes the amount of change of the upper limit value this time to be smaller than the amount of change last time. For instance, control range setting unit 111A uses a value obtained by multiplying the amount of change last time by a prescribed constant as the amount of change this time. The constant is a value larger than 0 and smaller than 1 and, by way of example, it is ½. By way of example, control range setting unit 111A may calculate the amount of change this time by subtracting a prescribed value from the last amount of change. Further, control range setting unit 111A stores the amount of change this time. The amount of change is used when the upper limit value UL2 is increased next time.

On the other hand, if the number of increase of the upper limit value UL2 is 0 (NO at step S111), the process proceeds to step S113. Here, the control for increasing the upper limit value UL2 has not been executed in the past. Therefore, there is no amount of change of the last time. Here, control range setting unit 111A uses an initial value as the amount of change this time.

After the process of step S112 or S113 is executed, the process of step S102 is executed. At step S102, control range setting unit 111A increases the upper limit value UL2 in accordance with the map, for example, shown in FIG. 17.

The process of steps S101, S102, S103 and S104 shown in FIG. 18 may be replaced by the process of steps S101A, S102A, S103A and S104A shown in FIG. 14, respectively. Here, when the travel distance of the vehicle reaches the standard value ($x_0$), charge ECU 48A increases the upper limit value UL2. Further, charge ECU 48A (control range setting unit 111A) makes smaller the amount of change of the upper limit value than the amount of change last time.

If the age of service of vehicle 1 becomes longer, or if the travel distance of vehicle 1 becomes longer, it is possible that the control for increasing the upper limit value UL2 is executed a number of times. If the amount of change is the same each time, the SOC at the completion of charging of battery 10 becomes high, since the upper limit value is increased repeatedly. Then, battery 10 comes to be kept at high SOC and, hence, deterioration of battery 10 may possibly be intensified.

By Embodiment 2, similar effects as in Embodiment 1 can be attained. Further, by Embodiment 2, excessive increase of upper limit value UL2 in the long life mode can be prevented. For instance, it is possible to prevent the upper limit value UL2 in the long life mode from exceeding the upper limit value UL1 in the normal mode. Since the upper limit value UL2 is smaller than the upper limit value UL1, the effect of reducing battery deterioration can be attained, even if the upper limit value UL2 is increased.

Embodiment 3

Figure 19:
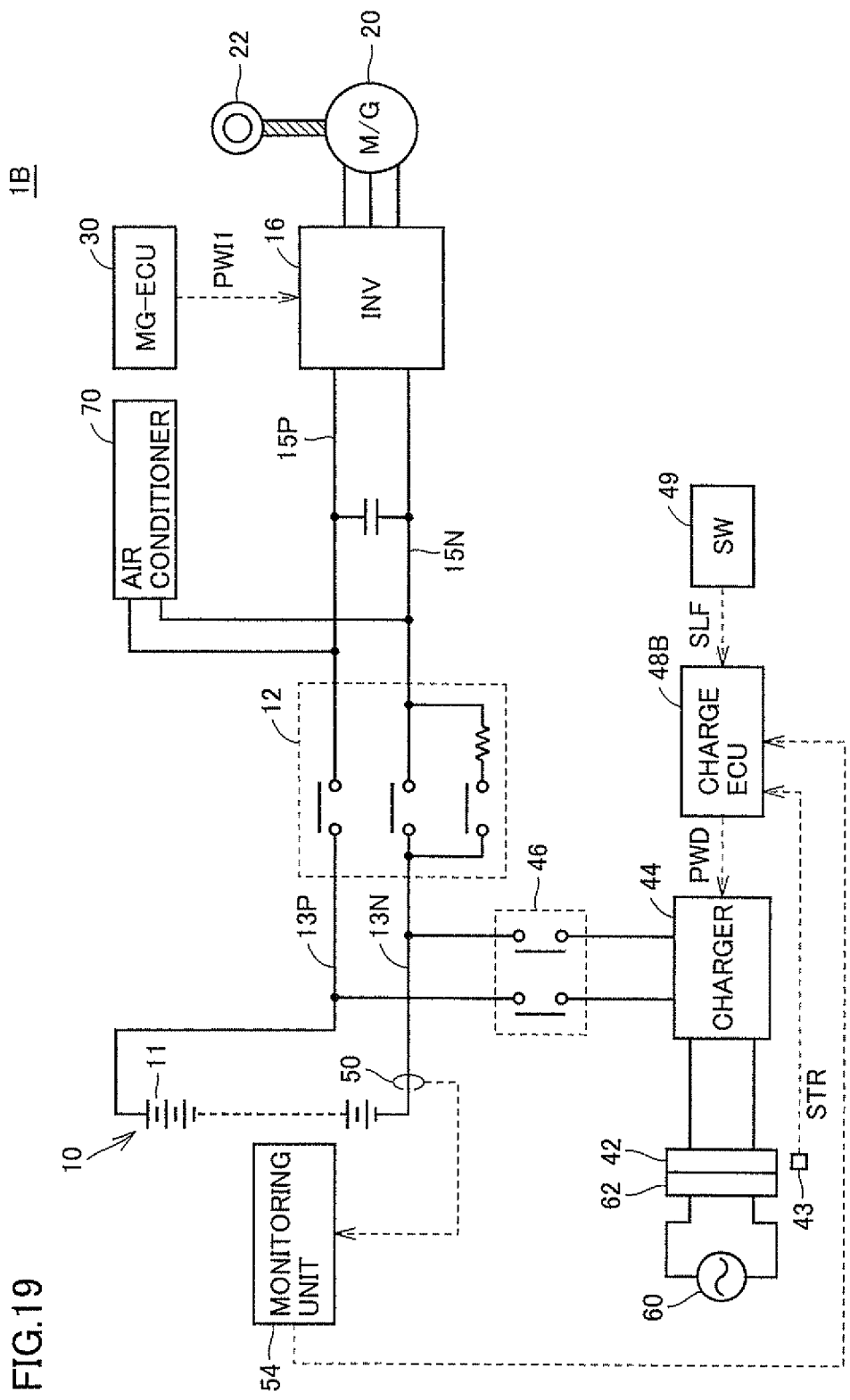
FIG. 19 is an overall block diagram of a vehicle in accordance with Embodiment 3 of the present invention.

FIG. 19 is an overall block diagram of a vehicle in accordance with Embodiment 3 of the present invention. Referring to FIGS. 19 and 1, a vehicle 1B is different from vehicle 1 in that it includes a charge ECU 48B in place of charge ECU 48.

Charge ECU 48B increases the upper limit value UL2 of SOC control range every time prescribed conditions related to deterioration of battery 10 are satisfied. It is noted that the upper limit value UL2 is set not to exceed a standard value. The standard value is determined in advance as a value that can prevent overcharging of battery 10.

Overcharging of battery 10 leads to a phenomenon causing deterioration of performance of battery 10. By way of example, metal lithium precipitates at the negative electrode of cell 11. Therefore, overcharging of battery 10 must be prevented. If the performance of a cell 11 lowers, the voltage of a battery block including the cell 11 possibly lowers.

Figure 20:
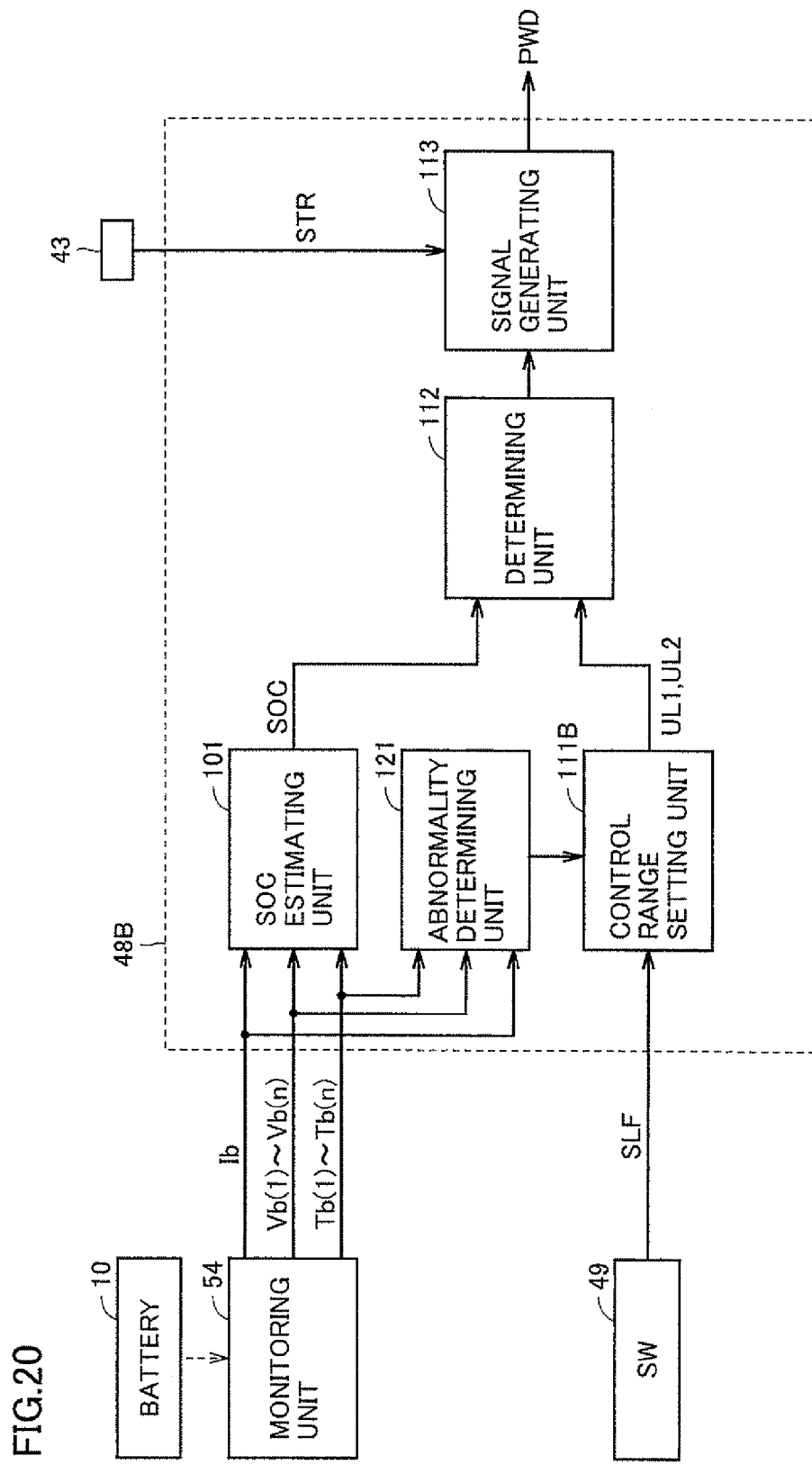
FIG. 20 is a functional block diagram of the charge ECU shown in FIG. 19.

FIG. 20 is a functional block diagram of the charge ECU shown in FIG. 19. Referring to FIGS. 20 and 3, charge ECU 48B is different from charge ECU 48 in that it additionally includes an abnormality detecting unit 121. Further, charge ECU 48B is different from charge ECU 48 in that it includes a control range setting unit 111B in place of control range setting unit 111A.

Abnormality determining unit 121 detects any abnormality of battery 10 based on the voltage, current and temperature of battery 10 detected by monitoring unit 54. By way of example, if at least one of voltage values Vb(1) to Vb(n) output from monitoring unit 54 is different from a normal value, abnormality detecting unit 121 detects abnormality of battery 10.

As described above, a monitor for monitoring voltage of cell 11 may be provided for each cell 11. By such a configuration, abnormality determining unit 121 can detect any abnormality of battery 10 based on the results of monitoring by the monitors.

As in Embodiment 1, control range setting unit 111B increases the upper limit value UL2 at least when the age of service of the vehicle reaches a standard value ($y_0$) or when the travel distance of the vehicle reaches a standard value ($x_0$). It is noted, however, that the maximum number of increasing the upper limit value is determined in advance. When the number of increase of the upper limit value has reached the maximum value, the upper limit value reaches the standard value. Therefore, if the number of increase of the upper limit value has reached the maximum value mentioned above, control range setting unit 111B does not further increase the upper limit value. Therefore, the upper limit value is kept at the standard value. In the following, control by charge ECU 48 when the age of service of the vehicle has reached the standard value ($y_0$) will be described as a representative.

Figure 21:
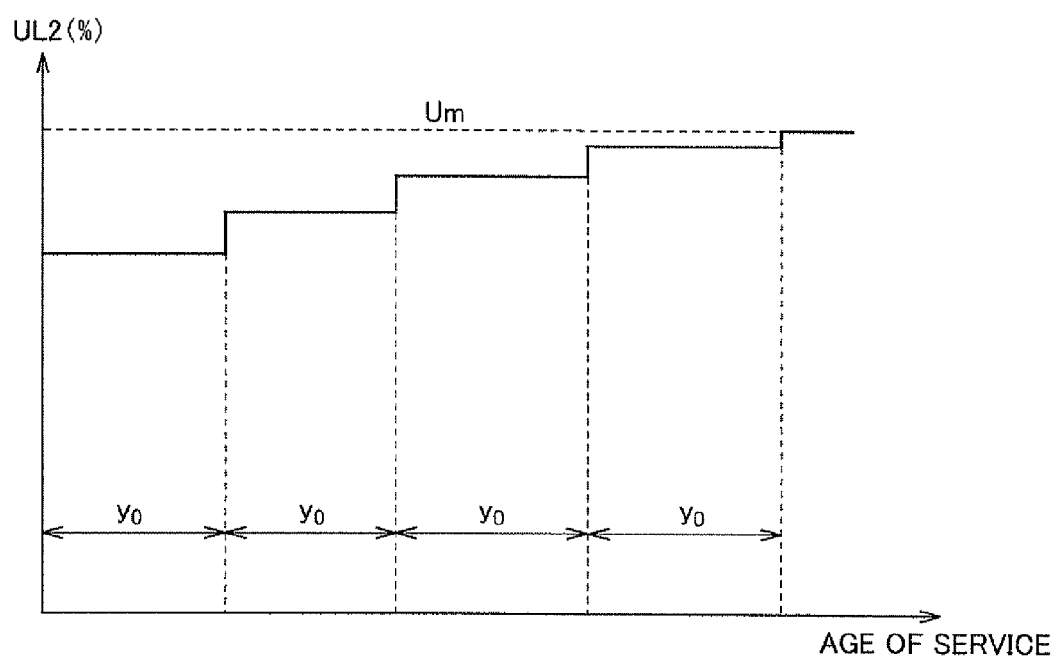
FIG. 21 is a graph representing control of an upper limit value of control range in accordance with Embodiment 3.

FIG. 21 is a graph representing control of an upper limit value of control range in accordance with Embodiment 3.

Referring to FIG. 21, at every $y_0$ years, the upper limit value UL2 increases. In the example shown in FIG. 21, when the age of service reached the year $4y_0$, the upper limit value UL2 becomes equal to the standard value Um. Specifically, the maximum number of increase of upper limit value UL2 is 4. After the year $4y_0$, the upper limit value UL2 is kept at Um. By way of example, charge ECU 48B stores the relation between the age of use and the upper limit value shown in FIG. 21 as a map (or a table).

Figure 22:
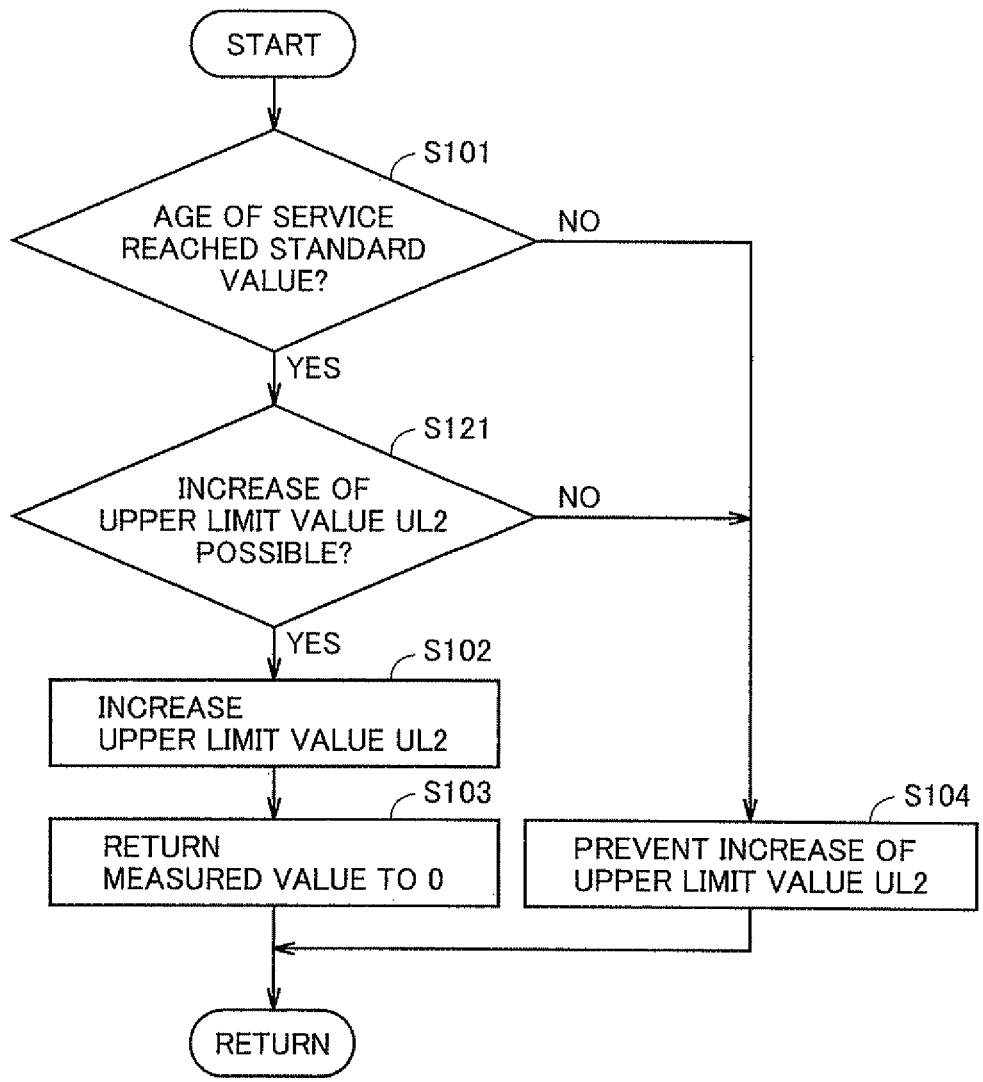
FIG. 22 is a flowchart representing a control executed by the charge ECU shown in FIG. 19.

FIG. 22 is a flowchart representing a control executed by the charge ECU shown in FIG. 19. The process shown in the flowchart is executed at every prescribed interval or every time prescribed conditions are satisfied.

Referring to FIGS. 22 and 13, the flowchart shown in FIG. 22 is different from the flowchart of FIG. 13 in that it additionally includes the process of step S121. If it is determined that the age of service of battery 10 has reached the standard value (YES at step S101), the process proceeds to step S121.

At step S121, charge ECU 48B determines whether or not it is possible to increase the upper limit value UL2. By way of example, if the number of increase of upper limit value UL2 has not yet reached the maximum number, control range setting unit 111B determines that increase of upper limit value UL2 is possible. In this case (YES at step S121), the process proceeds to step S102. At step S102, control range setting unit 111B increases the upper limit value UL2 in accordance with the map shown, for example, in FIG. 21.

On the other hand, if the number of increase of upper limit value UL2 has already reached the maximum value (NO at step S121), the process proceeds to step S104. Here, control range setting unit 111B prevents increase of upper limit value UL2. Thus, the upper limit value UL2 is kept at the standard value (Um).

The process of steps S101, S102, S103 and S104 shown in FIG. 22 may be replaced by the process of steps S101A, S102A, S103A and S104A shown in FIG. 14, respectively. Here, when the travel distance of the vehicle reaches the standard value ($x_0$), charge ECU 48B increases the upper limit value UL2. Further, charge ECU 48B (control range setting unit 111B) limits the upper limit value UL2 such that the upper limit value UL2 does not exceed the standard value.

Further, if any abnormality of battery 10 is detected by abnormality determining unit 121, control range setting unit 111B sets the upper limit value in accordance with a prescribed control pattern, so as not to intensify deterioration of battery 10. In the following, two control patterns applicable to an embodiment of the present invention will be described.

(First Control Pattern)

Figure 23:
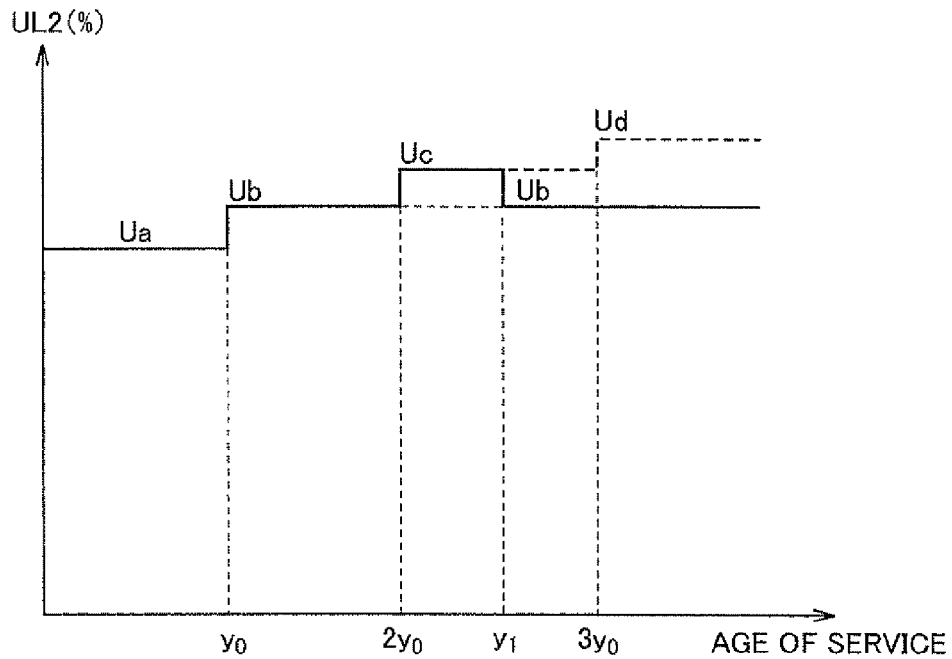
FIG. 23 is a graph representing a first control executed when abnormality of battery 10 is detected.

FIG. 23 is a graph representing a first control executed when abnormality of battery 10 is detected. Referring to FIG. 23, if the age of service of vehicle 1B reaches the year $y_0$, the upper limit value UL2 increases from Ua to Ub. Then, when the age of service of vehicle 1B reaches the year $2y_0$, the upper limit value UL2 increases from Ub to Uc. If any abnormality is not detected in battery 10, the upper limit value UL2 increases from Uc to Ud when the age of use of vehicle 10 reaches the year $3y_0$.

Assume that abnormality of battery 10 is detected when the age of service of vehicle 1B is $y_1$ ($2y_0 < y_1 < 3y_0$). For instance, in any of the plurality of cells 11, metal lithium precipitates, and the voltage value output from monitoring unit 54 goes out of the normal range. Thus, abnormality of battery 10 is detected by abnormality detecting unit 121.

Here, charge ECU 48B lowers the upper limit value UL2 from Uc to Ub. After the upper limit UL2 is decreased from Uc to Ub, increase of upper limit value UL2 is inhibited. Therefore, the upper limit value UL2 is kept at Ub. In the control shown in FIG. 23, when abnormality occurs in battery 10, the level of upper limit value UL2 is returned to the last level from the present level. The amount of decrease of upper limit UL2, however, is not limited.

Figure 24:
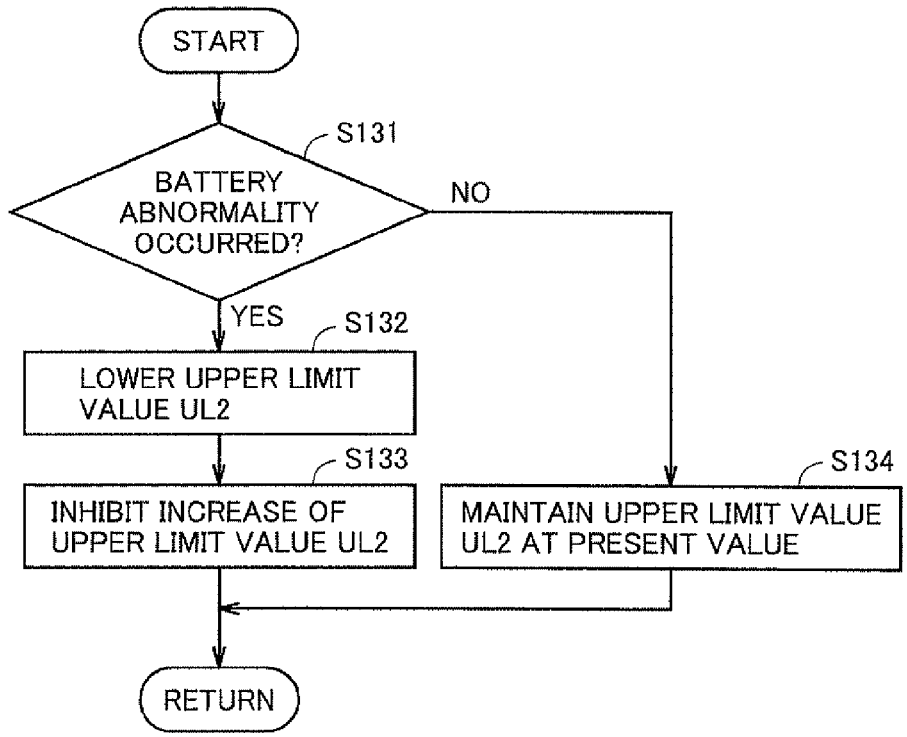
FIG. 24 is a flowchart representing the control shown in FIG. 23.

FIG. 24 is a flowchart representing the control shown in FIG. 23. Referring to FIG. 24, at step S131, charge ECU 48B (abnormality determining unit 121) determines whether or not any abnormality occurred in battery 10, based on detected values from monitoring unit 54. If it is determined that abnormality occurred in battery 10 (YES at step S131), the process proceeds to step S132. At step S132, charge ECU 48B (control range setting unit 111B) lowers the upper limit value UL2. At step S133, chare ECU 48B inhibits increase of upper limit value UL2.

On the other hand, if the battery 10 is determined to be normal (NO at step S131), the process proceeds to step S124. At step S134, charge ECU 48B (control range setting unit 111B) maintains the upper limit value at the current value. After the end of process step S133 or S134, the overall process returns to the main routine.

(Second Control Pattern)

Figure 25:
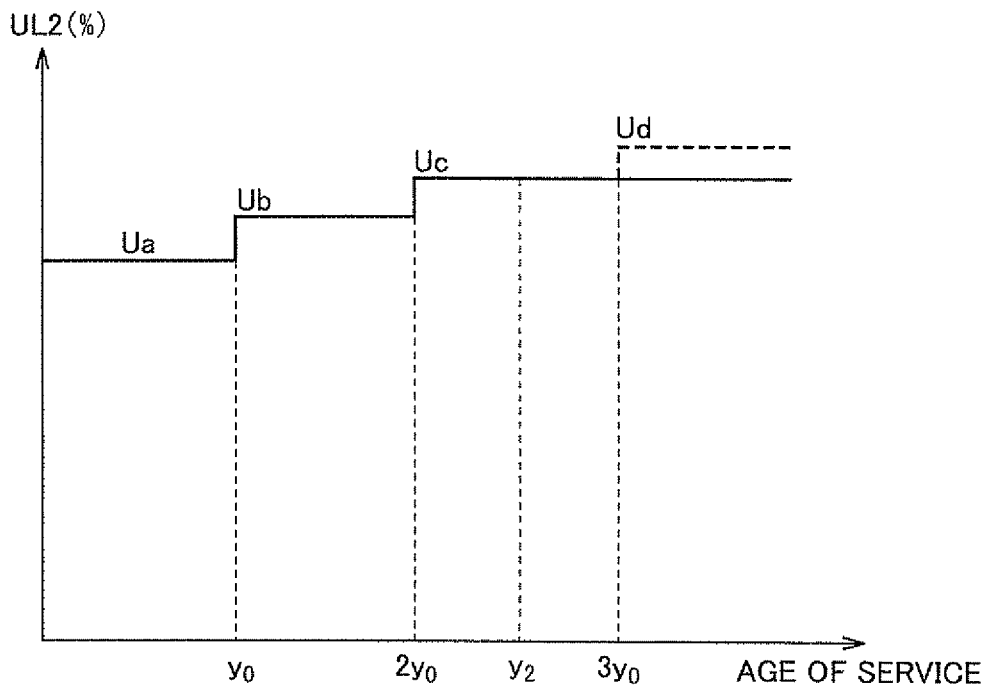
FIG. 25 is a graph representing a second control executed when abnormality of battery 10 is detected.

FIG. 25 is a graph representing a second control executed when abnormality of battery 10 is detected. Referring to FIG. 25, if any abnormality is not detected in battery 10, the upper limit value UL2 increases at every $y_0$ years. In this point, the second control pattern is the same as the first control pattern (see FIG. 23).

Assume that abnormality of battery 10 is detected when the age of service of vehicle 1B is $y_2$ ($2y_0 < y_2 < 3y_0$). For instance, in any of the plurality of cells 11, metal lithium precipitates, and the voltage value output from monitoring unit 54 goes out of the normal range, as described above. Thus, abnormality of battery 10 is detected by abnormality detecting unit 121. When abnormality of battery 10 is detected, charge ECU 48B inhibits increase of upper limit value UL2, and fixes the upper limit value UL2 at the present value. Then, the upper limit value UL2 is kept at Uc.

In the control patterns shown in FIGS. 23 and 25, the amount of change of the upper limit value when the upper limit value is increased may be constant. Alternatively, as in Embodiment 2, the amount of change in the upper limit value may be made smaller as the number of increase of the upper limit value increases.

Figure 26:
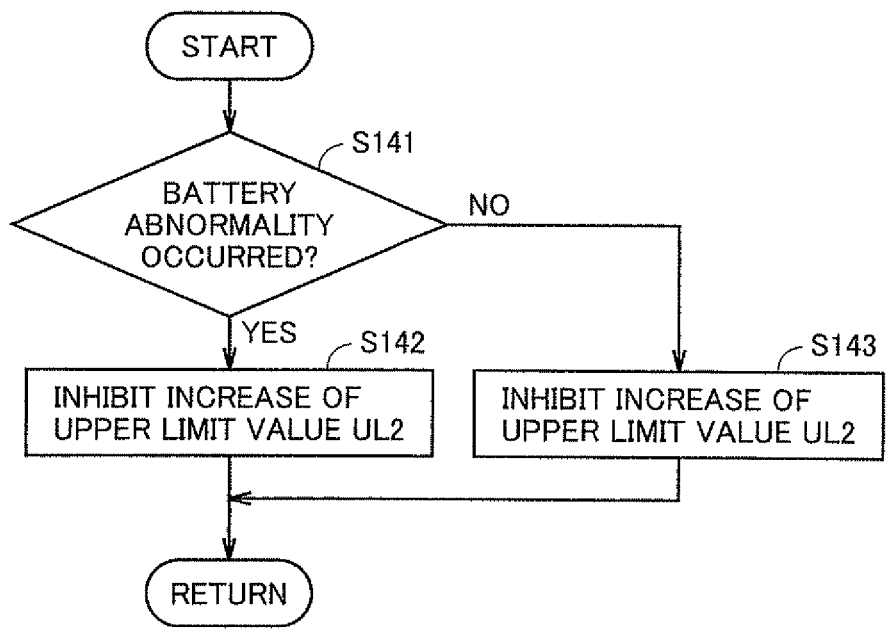
FIG. 26 is a first flowchart representing the control shown in FIG. 25.

FIG. 26 is a first flowchart representing the control shown in FIG. 25. Referring to FIG. 26, at step S141, charge ECU 48B (abnormality determining unit 121) determines whether or not any abnormality occurred in battery 10, based on detected values from monitoring unit 54. If it is determined that abnormality occurred in battery 10 (YES at step S141), the process proceeds to step S142. At step S142, charge ECU 4813 (control range setting unit 111B) inhibits increase of upper limit value UL2.

On the other hand, if the battery 10 is determined to be normal (NO at step S141), the process proceeds to step S143. At step S143, charge ECU 48B (control range setting unit 111B) permits increase of upper limit value UL2. After the end of process step S142 or S143, the overall process returns to the main routine.

Figure 27:
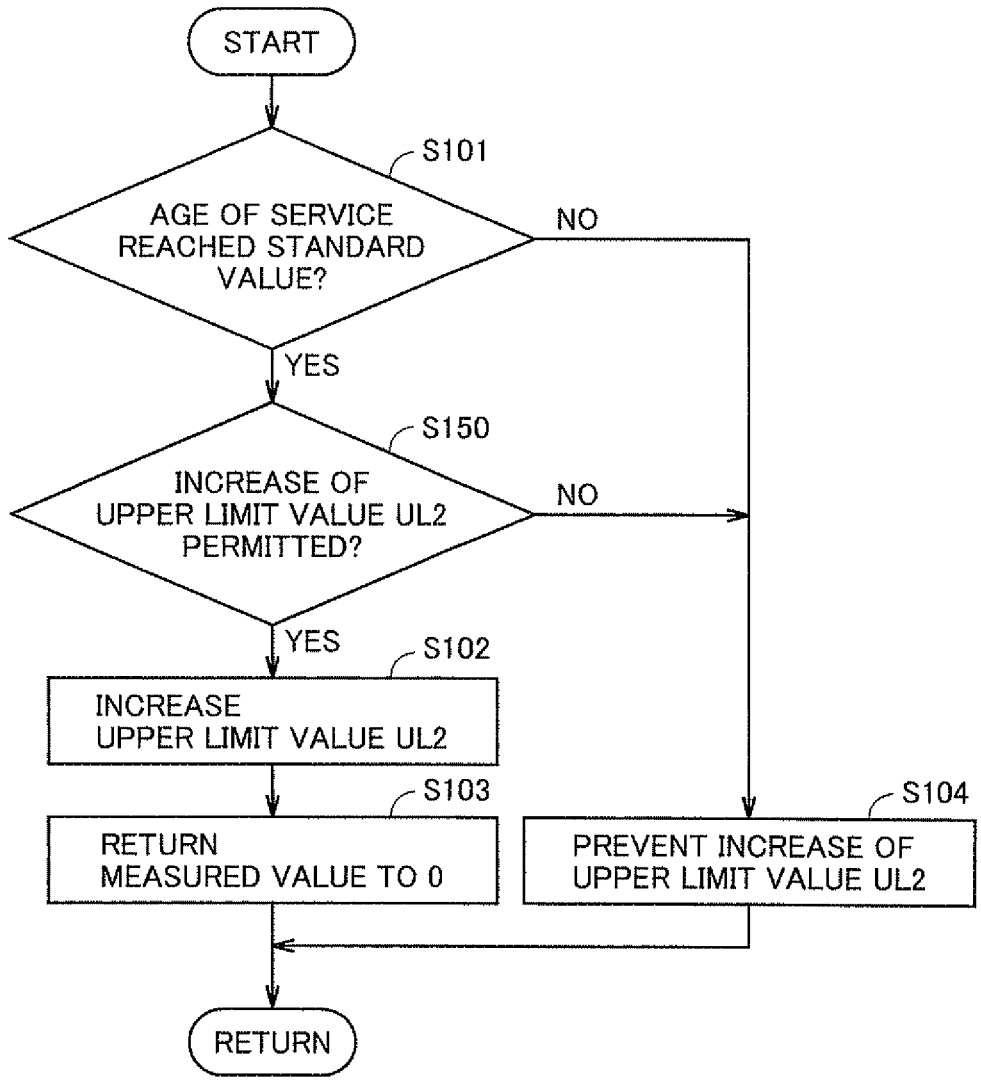
FIG. 27 is a second flowchart representing the control shown in FIG. 25.

FIG. 27 is a second flowchart representing the control shown in FIG. 25. Referring to FIGS. 27 and 13, the flowchart of FIG. 27 is different from the flowchart of FIG. 13 in that it additionally includes the process of step S150. The process of step S150 is executed if it is determined at step S101 that the age of service of the vehicle has reached the standard value.

At step S150, charge ECU 48B determines whether or not the increase of upper limit value UL2 is permitted. Based on the result of process shown in the flowchart of FIG. 26, charge ECU 48B determines whether or not the increase of upper limit value UL2 is permitted.

If it is determined that the increase of upper limit value UL2 is permitted (YES at step S150), the process proceeds to step S102. Therefore, the upper limit value increases. On the other hand, if it is determined that the increase of upper limit value UL2 is inhibited (NO at step S150), the process of step S104 is executed. At step S104, increase of upper limit value UL2 is prevented. Therefore, the upper limit value UL2 is kept at the present value.

The process of steps S101, S102, S103 and S104 shown in FIG. 27 may be replaced by the process of steps S101A, S102A, S103A and S104A shown in FIG. 14, respectively. Here, when the travel distance of the vehicle reaches the standard value ($x_0$) and the increase of upper limit value UL2 is permitted, control range setting unit 111B increases the upper limit value UL2. If the increase of upper limit value UL2 is inhibited, control range setting unit 111B fixes the upper limit value UL2 at the present value.

As described above, according to Embodiment 3, the upper limit value is limited so as not to exceed the standard value. The standard value is determined in advance to prevent overcharging of the battery. Therefore, according to Embodiment 3, even if the control for increasing the upper limit value is executed repeatedly, overcharging of battery can be prevented. Therefore, deterioration of battery 10 is not intensified.

Further, according to Embodiment 3, if any abnormality of battery 10 is detected, the charge ECU lowers the upper limit value. Therefore, continuous occurrence of abnormality in battery 10 can be prevented, and hence, deterioration of battery 10 can be reduced.

Further, according to Embodiment 3, if any abnormality of battery 10 is detected, the charge ECU inhibits increase of the upper limit value. Thus, deterioration of battery 10 is not intensified.

[Other Examples of Vehicle Configuration]

In Embodiments 1 to 3, vehicles including only a motor as the driving source for generating the driving force have been described. The present invention, however, is applicable to a vehicle including a power storage device and an electric motor generating driving force from the electric power stored in the storage device. Therefore, the present invention is applicable, for example, to a hybrid vehicle including an engine and an electric motor as driving sources.

Figure 28:
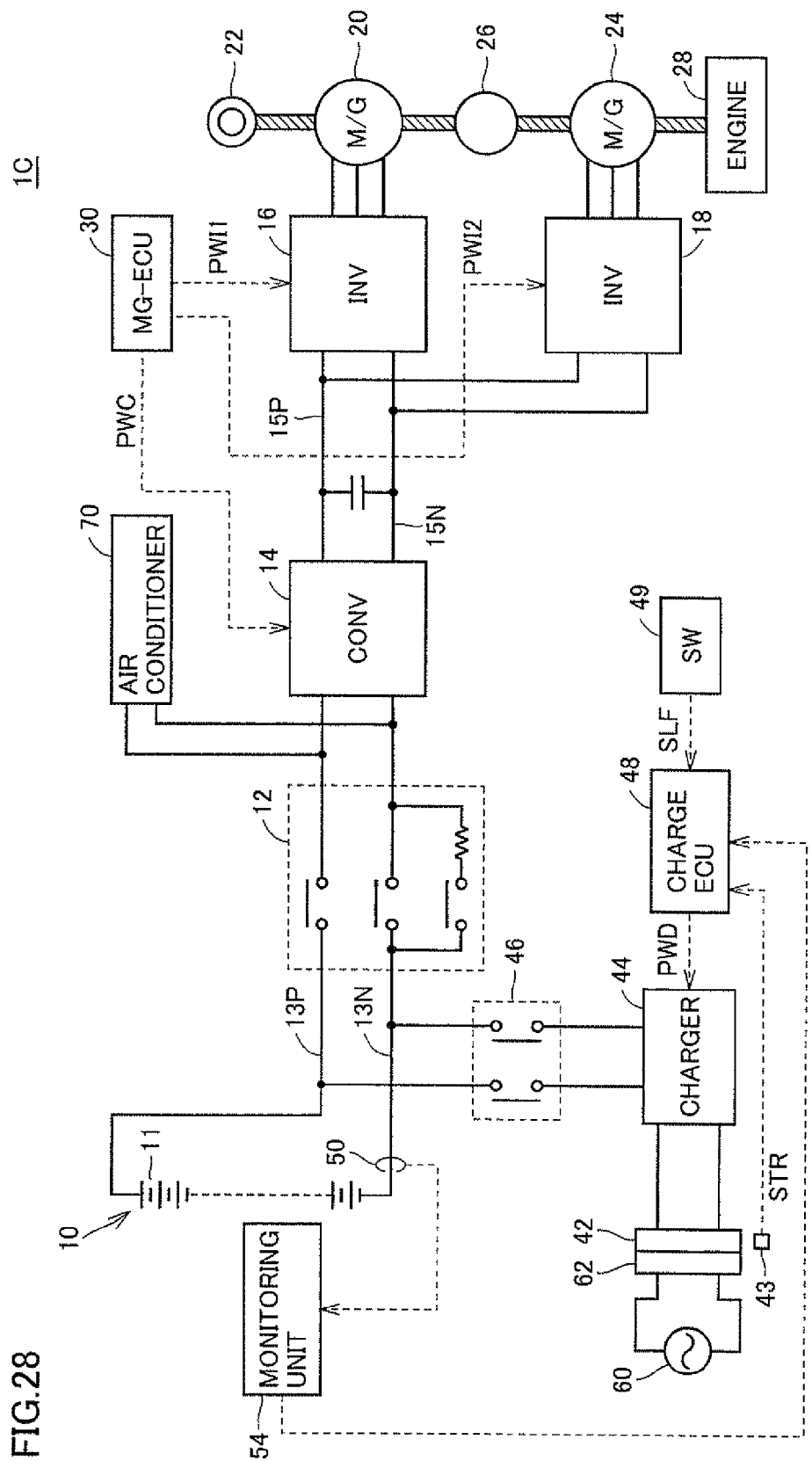
FIG. 28 shows a configuration of a hybrid vehicle as an example of the vehicle in accordance with the present invention.

FIG. 28 shows a configuration of a hybrid vehicle as an example of the vehicle in accordance with the present invention. Referring to FIGS. 28 and 1, a vehicle 1C is different from vehicle 1 in that it additionally includes a converter (CONV) 14, an inverter 18, an MG 24, a power split device 26, and an engine 28.

Engine 28 generates power by burning fuel such as gasoline. Converter 14 converts DC voltage across positive electrode line 13P and negative electrode line 13N and DC voltage across positive electrode line 15P and negative electrode line 15N to/from each other, based on the control signal PWC received from MG-ECU 30.

Inverter 18 has a structure similar to that of inverter 16 and realized, for example, by a three-phase bridge circuit. MG 24 is an AC rotating electrical machine, and it is implemented, for example, by a three-phase AC synchronous electric motor having a rotor with a permanent magnet embedded. Inverter 18 drives MG 24 based on a control signal PWI2 received from MG-ECU 30.

Driving shaft of MG 24 is coupled to power split device 26. Power split device 26 includes a planetary gear mechanism including a sun gear, a pinion gear, a planetary carrier and a ring gear. The rotation shaft of MG 24, a crank shaft of engine 28 and a driving shaft coupled to driving wheels 22 are connected to power split device 26. Power split device 26 distributes the power output from engine 28 to MG 24 and driving wheels 22. Thus, engine 28 can drive vehicle 1C.

In the configuration shown in FIG. 28, battery 10 can be charged by power source 60 provided outside of vehicle 1C. Further, by the driving force of MG 20, vehicle 1C can travel with engine 28 stopped. Therefore, the present invention is applicable to vehicle 1C having the configuration shown in FIG. 28. It is noted that vehicle 1C may include charge ECU 48A or 48B in place of charge ECU 48.

FIG. 28 shows a series/parallel type hybrid vehicle in which the power from engine 28 can be transmitted to driving wheels 22 and MG20 by power split device 26. The present invention is also applicable to hybrid vehicles of different types. By way of example, the present invention is applicable to a so-called series type hybrid vehicle in which only engine 28 is used for driving MG24 and vehicle driving force is generated only by MG20.

Further, the present invention is also applicable to a fuel cell vehicle including a fuel cell as a DC power source in addition to battery 10.

In the embodiments of the present invention, lithium ion battery is used as the power storage device for supplying electric power to the electric motor. The application of the present invention, however, is not limited to a vehicle using lithium ion battery. As long as a vehicle has a power storage device that may possibly be deteriorated when kept at the high SOC state and the vehicle has an electric motor of which driving force is generated by the power storage device, the present invention is applicable to such a vehicle.

Further, switching of charging mode may be automatically done by the charge ECU. For instance, if the charging mode is set to the normal mode and the travel distance exceeds the standard value before the age of travel reaches a prescribed number of years, the charge ECU may switch the charging mode from the normal mode to the long life mode. Conditions for charge ECU to switch the charging mode are not specifically limited.

Further, in the present embodiment, the charge ECU is configured to be able to switch the charging mode between the normal mode and the long life mode. The vehicle in accordance with the present invention, however, may have only the long life mode as the charging mode. In this case also, the charge ECU increases the upper limit value of the SOC control range if prescribed conditions related to the deterioration of battery 10 are satisfied. Therefore, it becomes possible to prevent decrease of cruising distance (to ensure the target cruising distance or longer) and to reduce deterioration of battery 10.

Even if the charging mode is only the long life mode, it is possible to set the amount of change of the upper limit value such that the upper limit value is lower than a prescribed value. The prescribed value is determined in consideration of overcharge of the battery. In this case, though SOC reaches the upper limit value of SOC at the time of charging the battery, the upper limit does not exceed the prescribed value. Therefore, overcharge of the battery can be prevented.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST 1, 1A-1C vehicles, 10 battery, 11 cell, 12 system main relay, 13N, 15N negative electrode lines, 13P, 15P positive electrode lines, 14 converter, 16, 18 inverters, 20, 24 motor generators, 22 driving wheels, 26 power split device, 28 engine, 42 charge inlet, 43 sensor, 44 charger, 46 relay, 48, 48A, 48B charge ECUs, 49 switch, 50 current sensor, 54 monitoring unit, 56(1)-56(n) sensors, 58 analog-digital converter, 60 power source, 62 connector, 70 air conditioner, 101 SOC estimating unit, 111, 111A, 111B control range setting units, 112 determining unit, 113 signal generating unit, 121 abnormality determining unit, BB(1)-BB(n) battery blocks.

The invention claimed is:

1. A vehicle, comprising:
a power storage device configured to be rechargeable;
an electric motor configured to generate driving force for driving said vehicle by using electric power stored in said storage device;
a charging mechanism configured to supply electric power output from a power source outside said vehicle to said power storage device; and
a controller configured to control state of charge of said power storage device when said power storage device is charged,
said controller including:
a state estimating unit configured to calculate an index value indicating said state of charge;
a detecting unit configured to detect abnormality occurred in said power storage device, and
a setting unit configured to increase an upper limit value of said index value when prescribed condition related to deterioration of said power storage device is satisfied, wherein
said setting unit is configured to set an amount of change of said upper limit value such that possible distance of travel of said vehicle attains to a target distance or longer, to make smaller said amount of change as the number of increase of said upper limit value increases, to increase said upper limit value repeatedly until said upper limit value reaches a standard value, to maintain said upper limit value at said standard value once said upper limit value reached the standard value, and to maintain said upper limit value at a present value when said abnormality is detected by said detecting unit.

2. The vehicle according to claim 1, wherein
said prescribed condition is determined in advance based on period of use of said vehicle.

3. The vehicle according to claim 1, wherein
said prescribed condition is determined in advance based on travel distance of said vehicle.

4. The vehicle according to claim 1, wherein
said setting unit is capable of switching between a first mode having said upper limit value fixed and a second mode allowing adjustment of said upper limit value, and sets said amount of change in said second mode.

5. The vehicle according to claim 4, further comprising:
a command generating unit configured to switch between generation of a command to extend a useable period of said power storage device and stopping of generation of said command, by a manual operation, wherein
said setting unit selects said second mode from said first and second modes when said command generating unit generates said command, and selects said first mode from said first and second modes when said command generating unit stops generation of said command.

6. The vehicle according to claim 1, wherein
said controller further includes:
a detecting unit configured to detect any abnormality occurring in said power storage device; and
said setting unit is configured to lower said upper limit value when said abnormality is detected by said detecting unit.

7. A method of controlling a vehicle, wherein
said vehicle includes:
a power storage device configured to be rechargeable;
an electric motor configured to generate driving force for driving said vehicle by using electric power stored in said storage device;
a charging mechanism configured to supply electric power output from a power source outside said vehicle to said power storage device; and
a controller configured to control state of charge of said power storage device when said power storage device is charged,
said method comprising the steps of:
calculating an index value indicating said state of charge; and
increasing an upper limit value of said index value when prescribed condition related to deterioration of said power storage device is satisfied, wherein at said step of increasing the upper limit value, an amount of change of said upper limit value is set such that possible distance of travel of said vehicle attains to a target distance or longer;
said control method further comprising the steps of:
making smaller said amount of change as the number of increase of said upper limit value increases;
limiting said upper limit value so that said upper limit value does not exceed a standard value when said upper limit value is increased repeatedly;
detecting any abnormality occurring in said power storage device; and
fixing said upper limit value at a present value said abnormality is detected.

8. The vehicle control method according to claim 7, wherein
said prescribed condition is determined in advance based on period of use of said vehicle.

9. The vehicle control method according to claim 7, wherein
said prescribed condition is determined in advance based on travel distance of said vehicle.

10. The vehicle control method according to claim 7, further comprising the step of:
selecting one of a first mode having said upper limit value fixed and a second mode allowing adjustment of said upper limit value, wherein
at said step of increasing said upper limit value, said amount of change is set when said second mode is selected.

11. The vehicle control method according to claim 10, wherein
said vehicle further includes:
a command generating unit configured to switch between generation of a command to extend a useable period of said power storage device and stopping of generation of said command, by a manual operation; and
at said step of selecting, said second mode is selected from said first and second modes when said command generating unit generates said command, and said first mode is selected from said first and second modes when said command generating unit stops generation of said command.

12. The vehicle control method according to claim 7, further comprising the steps of:
   detecting any abnormality occurring in said power storage device; and
   lowering said upper limit value when said abnormality is detected.

\* \* \* \* \*